United States Patent
Pappacena et al.

(10) Patent No.: US 10,336,653 B2
(45) Date of Patent: Jul. 2, 2019

(54) CHROMIUM OXIDE REFRACTORY OBJECT AND METHODS OF FORMING THEREOF

(71) Applicant: SAINT-GOBAIN CERAMICS & PLASTICS, INC., Worcester, MA (US)

(72) Inventors: Kristen E. Pappacena, Westborough, MA (US); Julien P. Fourcade, Shrewsbury, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/422,605

(22) Filed: Feb. 2, 2017

(65) Prior Publication Data

US 2017/0226017 A1    Aug. 10, 2017

Related U.S. Application Data

(60) Provisional application No. 62/291,658, filed on Feb. 5, 2016.

(51) Int. Cl.
   *C04B 35/12* (2006.01)
   *C04B 35/42* (2006.01)
   (Continued)

(52) U.S. Cl.
   CPC .............. *C04B 35/42* (2013.01); *C04B 35/12* (2013.01); *C04B 35/62204* (2013.01);
   (Continued)

(58) Field of Classification Search
   CPC .................................. C04B 35/12; C04B 35/42
   See application file for complete search history.

(56) References Cited

U.S. PATENT DOCUMENTS

| 4,490,474 A | 12/1984 | Staten |
| 4,724,224 A | 2/1988 | Staley, Jr. et al. |

(Continued)

FOREIGN PATENT DOCUMENTS

| CN | 102105416 A | 6/2011 |
| CN | 103068749 A | 4/2013 |

(Continued)

OTHER PUBLICATIONS

Khattab R.M. et al., "Alumina-zircon refractory materials for lining of the basin of glass furnaces: Effect of processing technique and TiO2 addition," Ceramics International, 41, dated 2015, pp. 1623-1629.

(Continued)

*Primary Examiner* — Karl E Group
(74) *Attorney, Agent, or Firm* — Abel Schillinger, LLP; Adam Keser

(57) ABSTRACT

A refractory object may include a $Cr_2O_3$ content of at least about 80 wt. % of a total weight of the refractory object, an $Al_2O_3$ content of at least about 0.7 wt. % and not greater than about 10.0 wt. % of the total weight of the refractory object, a $SiO_2$ content of at least about 0.3 wt. % and not greater than about 5.0 wt. % of the total weight of the refractory object and a $TiO_2$ content of at least about 1.0 wt. % and not greater than about 5.6 wt. % $TiO_2$ of the total weight of the refractory object. The refractory object may further include an MOR of at least about 37 MPa as measured at 1200° C.

6 Claims, 1 Drawing Sheet

(51) Int. Cl.
*C04B 35/622* (2006.01)
*C04B 38/00* (2006.01)
*C04B 111/76* (2006.01)

(52) U.S. Cl.
CPC ......... *C04B 38/00* (2013.01); *C04B 2111/763* (2013.01); *C04B 2235/3206* (2013.01); *C04B 2235/3217* (2013.01); *C04B 2235/3232* (2013.01); *C04B 2235/3244* (2013.01); *C04B 2235/3249* (2013.01); *C04B 2235/3418* (2013.01); *C04B 2235/72* (2013.01); *C04B 2235/77* (2013.01); *C04B 2235/96* (2013.01)

(56) References Cited

U.S. PATENT DOCUMENTS

| | | | |
|---|---|---|---|
| 5,106,795 | A | 4/1992 | Drake et al. |
| 7,704,905 | B2 | 4/2010 | Addiego et al. |
| 7,754,633 | B2 | 7/2010 | Prior et al. |
| 7,928,029 | B2 | 4/2011 | Addiego et al. |
| 8,609,563 | B2 | 12/2013 | Citti et al. |
| 9,242,885 | B2* | 1/2016 | Citti ................. C03B 5/1672 |
| 2006/0211566 | A1* | 9/2006 | Champion .......... C04B 35/12 501/103 |
| 2012/0067086 | A1* | 3/2012 | Citti ..................... C04B 35/12 65/374.13 |
| 2014/0013807 | A1* | 1/2014 | Citti ..................... C03B 5/1672 65/374.13 |
| 2014/0030163 | A1* | 1/2014 | His ...................... C04B 35/12 422/241 |
| 2015/0267133 | A1* | 9/2015 | Raffin ................ C04B 35/12 422/241 |

FOREIGN PATENT DOCUMENTS

| | | | | |
|---|---|---|---|---|
| FR | 2974081 | A1 * | 10/2012 | ............ C04B 35/12 |
| FR | 2974082 | A1 * | 10/2012 | ............ C04B 35/12 |
| FR | 2996843 | A1 * | 4/2014 | ............ C04B 35/12 |
| JP | 2003-238251 | A | 8/2003 | |
| WO | WO-2012140624 | A1 * | 10/2012 | ............ C04B 35/12 |
| WO | WO-2014060940 | A1 * | 4/2014 | ............ C04B 35/12 |

OTHER PUBLICATIONS

International Search Report and Written Opinion for PCT Application No. PCT/US2017/016125, dated May 15, 2017, 11 pages.
Guo, Zong-qi et al., "The Optimization of the Microstructure and Phase Assemblage of High Chromia Refractories," Journal of the European Ceramic Society, vol. 19, dated 1999, pp. 113-117.

* cited by examiner

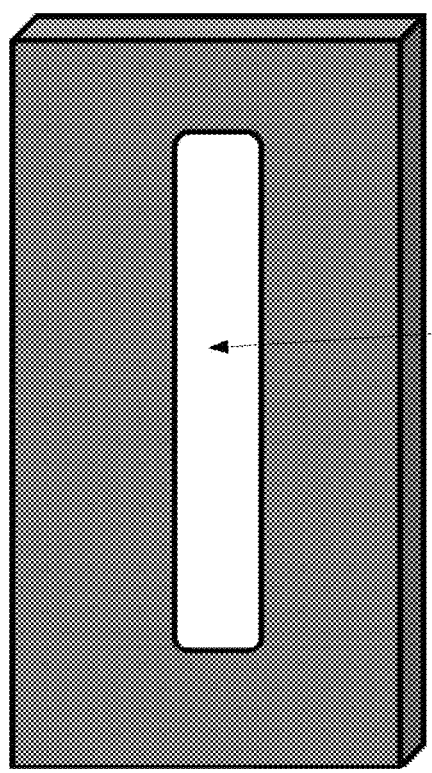

US 10,336,653 B2

CHROMIUM OXIDE REFRACTORY OBJECT AND METHODS OF FORMING THEREOF

CROSS-REFERENCE TO RELATED APPLICATION(S)

This application claims priority under 35 U.S.C. § 119(e) to U.S. Provisional Patent Application No. 62/291,658, entitled "CHROMIUM OXIDE REFRACTORY OBJECT AND METHODS OF FORMING THEREOF," by Kristen E. PAPPACENA et al., filed on Feb. 5, 2016, which is assigned to the current assignee hereof and is incorporated herein by reference in its entirety.

FIELD OF THE DISCLOSURE

The following is directed generally to a chromium oxide refractory object and methods of forming a chromium oxide refractory object. More particularly, the following is directed to a chromium oxide refractory block that can be used as sidewall blocks or as glass delivery blocks (i.e., flow blocks or bushing blocks).

BACKGROUND

Sintered products produced from chromium oxide are widely used in glass furnaces, in particular, when melting glass intended for the manufacture of glass fibers.

However, chromium oxide is particularly sensitive to thermo-mechanical stress when it is exposed to severe temperature gradients. Such temperature gradients generate elastic stress that may lead to cracks in the sintered products which increases wear of the refractory material or complete failure of the parts formed from the refractory material. In order to decrease the risk of cracking of a refractory block, it is necessary to increase its strength while maintaining or reducing the thermoelastic stresses generated during operation. The current development of very high-quality glasses combined with the need extended product lifetime, increases the demand for improved refractory products in glass furnaces, in particular, in chromium oxide refractory objects. Accordingly, the industry continues to demand improved chromium oxide refractory materials having improved resistance to thermoelastic stress.

SUMMARY

According to a first aspect, a refractory object may include a $Cr_2O_3$ content of at least about 80 wt. % of a total weight of the refractory object, an $Al_2O_3$ content of at least about 0.7 wt. % and not greater than about 10.0 wt. % of the total weight of the refractory object, a $SiO_2$ content of at least about 0.3 wt. % and not greater than about 5.0 wt. % of the total weight of the refractory object and a $TiO_2$ content of at least about 1.0 wt. % and not greater than about 5.6 wt. % $TiO_2$ of the total weight of the refractory object. The refractory object may further include an MOR of at least about 37 MPa as measured at 1200° C.

According to another aspect, a refractory object may include a $Cr_2O_3$ content of at least about 80 wt. % of a total weight of the refractory object, an $Al_2O_3$ content of at least about 0.7 wt. % and not greater than about 10.0 wt. % of the total weight of the refractory object, a $SiO_2$ content of at least about 0.3 wt. % and not greater than about 5.0 wt. % of a total weight of the refractory object and a $TiO_2$ content of at least about 1.0 wt. % and not greater than about 5.6 wt. % $TiO_2$ of the total weight of the refractory object. The refractory object may further include a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

According to still another aspect, a refractory object may include a $Cr_2O_3$ content of at least about 80 wt. % of a total weight of the refractory object, a $TiO_2$ content of at least about 1.0 wt. % and not greater than about 5.6 wt. % $TiO_2$ of the total weight of the refractory object. The refractory object may further include a ratio $ROC_{Al2O3}/ROC_{SiO2}$ of at least about 1 and not greater than about 8, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

According to yet another aspect, a method of forming a refractory object may include providing a forming composition and forming the $Cr_2O_3$ composition into a refractory object. The refractory object may include a $Cr_2O_3$ content of at least about 80 wt. % of a total weight of the refractory object, an $Al_2O_3$ content of at least about 0.7 wt. % and not greater than about 10.0 wt. % of the total weight of the refractory object, a $SiO_2$ content of at least about 0.3 wt. % and not greater than about 5.0 wt. % of the total weight of the refractory object and a $TiO_2$ content of at least about 1.0 wt. % and not greater than about 5.6 wt. % $TiO_2$ of the total weight of the refractory object. The refractory object may further include an MOR of at least about 37 MPa as measured at 1200° C.

According to still another aspect, a method of forming a refractory object may include providing a $Cr_2O_3$ composition and forming the $Cr_2O_3$ composition into a refractory object. The refractory object may include a $Cr_2O_3$ content of at least about 80 wt. % of a total weight of the refractory object, an $Al_2O_3$ content of at least about 0.7 wt. % and not greater than about 10.0 wt. % of the total weight of the refractory object, a $SiO_2$ content of at least about 0.3 wt. % and not greater than about 5.0 wt. % of a total weight of the refractory object and a $TiO_2$ content of at least about 1.0 wt. % and not greater than about 5.6 wt. % $TiO_2$ of the total weight of the refractory object. The refractory object may further include a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

According to yet another aspect, a method of forming a refractory object may include providing a $Cr_2O_3$ composition and forming the $Cr_2O_3$ composition into a refractory object. The refractory object may include a $Cr_2O_3$ content of at least about 80 wt. % of a total weight of the refractory object, a $TiO_2$ content of at least about 1.0 wt. % and not greater than about 5.6 wt. % $TiO_2$ of the total weight of the refractory object. The refractory object may further include a ratio $ROC_{Al2O3}/ROC_{SiO2}$ of at least about 1 and not greater than about 8, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

According to still another aspect, a refractory object may be formed from a forming composition that may include a $Cr_2O_3$ content of at least about 80 wt. % of a total weight of the forming composition, an $Al_2O_3$ content of at least about 0.7 wt. % and not greater than about 10.0 wt. % of the total weight of the forming composition, a $SiO_2$ content of at least about 0.3 wt. % and not greater than about 5.0 wt. % of the total weight of the forming composition and a $TiO_2$ content of at least about 1.0 wt. % and not greater than about 5.6 wt. % $TiO_2$ of the total weigh of the forming composition. The refractory object may further include an MOR of at least about 37 MPa as measured at 1200° C.

According to yet another aspect, a refractory object may be formed from a forming composition that may include a $Cr_2O_3$ content of at least about 80 wt. % of a total weight of the forming composition, an $Al_2O_3$ content of at least about 0.7 wt. % and not greater than about 10.0 wt. % of the total weight of the forming composition, a $SiO_2$ content of at least about 0.3 wt. % and not greater than about 5.0 wt. % of the total weight of the forming composition and a $TiO_2$ content of at least about 1.0 wt. % and not greater than about 5.6 wt. % $TiO_2$ of the total weigh of the forming composition. The refractory object may further include a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

According to yet another aspect, a refractory object may be formed from a forming composition that may include a $Cr_2O_3$ content of at least about 80 wt. % of a total weight of the forming composition and a $TiO_2$ content of at least about 1.0 wt. % and not greater than about 5.6 wt. % $TiO_2$ of the total weigh of the forming composition. The refractory object may further include a ratio $ROC_{Al2O3}/ROC_{SiO2}$ of at least about 1 and not greater than about 8, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

According to still another aspect, a method of forming a refractory object may include providing a forming composition and forming the forming composition into a refractory object. The forming composition may include a $Cr_2O_3$ content of at least about 80 wt. % of a total weight of the forming composition, an $Al_2O_3$ content of at least about 0.7 wt. % and not greater than about 10.0 wt. % of the total weight of the forming composition, a $SiO_2$ content of at least about 0.3 wt. % and not greater than about 5.0 wt. % of the total weight of the forming composition and a $TiO_2$ content of at least about 1.0 wt. % and not greater than about 5.6 wt. % $TiO_2$ of the total weigh of the forming composition. The refractory object may further include an MOR of at least about 37 MPa as measured at 1200° C.

According to still another aspect, a method of forming a refractory object may include providing a forming composition and forming the forming composition into a refractory object. The forming composition may include a $Cr_2O_3$ content of at least about 80 wt. % of a total weight of the forming composition, an $Al_2O_3$ content of at least about 0.7 wt. % and not greater than about 10.0 wt. % of the total weight of the forming composition, a $SiO_2$ content of at least about 0.3 wt. % and not greater than about 5.0 wt. % of the total weight of the forming composition and a $TiO_2$ content of at least about 1.0 wt. % and not greater than about 5.6 wt. % $TiO_2$ of the total weigh of the forming composition. The refractory object may further include a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

According to still another aspect, a method of forming a refractory object may include providing a forming composition and forming the forming composition into a refractory object. The forming composition may include a $Cr_2O_3$ content of at least about 80 wt. % of a total weight of the forming composition and a $TiO_2$ content of at least about 1.0 wt. % and not greater than about 5.6 wt. % $TiO_2$ of the total weigh of the forming composition. The refractory object may further include a ratio $ROC_{Al2O3}/ROC_{SiO2}$ of at least about 1 and not greater than about 8, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

BRIEF DESCRIPTION OF THE DRAWINGS

The present disclosure may be better understood, and its numerous features and advantages made apparent to those skilled in the art by referencing the accompanying drawings. Embodiments are illustrated by way of example and are not limited in the accompanying FIGURES.

FIG. includes a schematic diagram illustrating a particular embodiment of a glass delivery block (or bushing block).

Skilled artisans appreciate that elements in the figures are illustrated for simplicity and clarity and have not necessarily been drawn to scale. For example, the dimensions of some of the elements in the FIGURES may be exaggerated relative to other elements to help to improve understanding of embodiments of the invention.

DETAILED DESCRIPTION

The following is generally directed to a refractory object having a chromium oxide body and a method of forming a refractory object having a chromium oxide body. According to embodiments described herein, a chromium oxide body may be defined as any body where a majority of the composition of the body is a chromium oxide material. According to particular embodiments described herein, the refractory object may further include an $Al_2O_3$ content, a $SiO_2$ content and a $TiO_2$ content.

According to a particular embodiment, a method of forming a refractory object in accordance with embodiments described herein may include providing a forming composition and forming the forming composition into the refractory object.

The forming composition may include a mixture of raw material powder used in forming the refractory object. This raw material powder may initially include an unprocessed raw material, for example, unprocessed $Cr_2O_3$ material, unprocessed $Al_2O_3$ material, unprocessed $SiO_2$ material and unprocessed $TiO_2$ material.

Providing the forming composition may include combining or mixing the raw material and any additional materials (i.e., sintering aids, binders, other additives, etc.) by any suitable method. Mixing or batch preparation may be performed dry or wet. Mixing may include an addition step of granulation. The granulation step may be added to improve flowability of the batch and therefore increase apparent density of the green body. In one example embodiment, granulation may be performed using spray drying. The raw material powders may be mixed into a blunge tank and then spray dried.

Forming the forming composition into the refractory object may include shaping the spray dried powder or batch to form a green body having a particular shape using isostatic pressing. The raw material powder is filled into a rubber mold maintained in a solid metallic can. The bag is then sealed and a vacuum is applied to the raw material powder. The can is then submerged into a pressure vessel filled with a fluid and then pressed. After pressing the mold is removed from the pressure vessel and the green body is removed.

Shaping may occur at a particular pressure, for example, by isostatic pressing at a pressure at least about 50 MPa, such as, at least about 60 MPa, at least about 70 MPa, at least about 80 MPa, at least about 90 MPa, at least about 100 MPa, at least about 110 MPa, at least about 120 MPa, at least about 130 MPa, at least about 140 MPa or even at least about 150 MPa. The pressure may be applied step by step to the green body using an isostatic pressing cycle lasting for about 10 minutes to about 120 minutes. These pressing cycles may limit formation of defects during the pressing stage. Shaping may also be performed using alternative techniques such as slip casting or unidirectional pressing.

The shape of the green body can be rectilinear, cylindrical, spherical, ellipsoidal or nearly any other shape. In a particular embodiment, the green body can be in the shape of a rectilinear block referred to as a blank that can subsequently be machined to form a prism block, a flow block or a bushing block. In another particular embodiment, the green body may have at least one dimension larger than about 100 mm, such as, larger than about 200 mm, larger than about 300 mm, larger than about 400 mm, larger than about 500 mm, larger than about 600 mm, larger than about 700 mm or even larger than about 800 mm. In another embodiment, the green body can be structured in such a fashion to more closely match a final component, for example, a forming block, to limit post forming processes.

FIG. illustrates a bushing block 100. The bushing block 100 can include an aperture 110. The aperture 110 can have different shapes or dimensions along the length of the bushing block 100. It can also be tapered along the thickness of the bushing block. Other shapes may be used to meet the needs or desires for a particular application.

After the green body is formed, the green body can be heated in an oven, heater, furnace, or the like to form the refractory object that includes the $Cr_2O_3$ forming composition. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. In one embodiment, following the initial heating, the green body can be sintered at a temperature of at least about 1400° C., such as, at least about 1450° C., at least about 1500° C. In another embodiment, following the initial heating, the green body can be sintered at a temperature of not greater than about 1550° C. or even not greater than about 1500° C. The green body can be sintered for a time period in a range of approximately 10 hours to approximately 100 hours to form the body.

In another embodiment, the oxygen content in the atmosphere of the furnace may be adjusted in order to limit the volatilization of chromium oxide during the sintering. For example, the partial pressure of oxygen ("$pO_2$") of the atmosphere of the furnace may be not greater than $10^{-1}$ atm., such as, not greater than $10^{-3}$ atm., not greater than $10^{-5}$ atm., not greater than $10^{-7}$ atm., not greater than $10^{-9}$ atm., not greater than $10^{-11}$ atm. or even not greater than $10^{-13}$ atm.

Sintering can include heating the green body up to a sintering temperature at a particular heating rate for multiple time periods in a sintering cycle for a set duration and then cooling the sintered body at a particular cooling-rate.

According to one particular embodiment, the heating rate may be at least about 1° C./h, such as, at least about 3° C./h, at least about 5° C./h, at least about 8° C./h, at least about 10° C./h, at least about 13° C./h, at least about 15° C./h, at least about 18° C./h, at least about 20° C./h, at least about 23° C./h, at least about 25° C./h, at least about 28° C./h or even at least about 29° C./h. According to still other embodiments, the heating rate may be not greater than about 30° C./h, such as, not greater than about 27° C./h, not greater than about 25° C./h, not greater than about 22° C./h, not greater than about 20° C./h, not greater than about 17° C./h, not greater than about 15° C./h, not greater than about 12° C./h, not greater than about 10° C./h, not greater than about 7° C./h, not greater than about 5° C./h or even not greater than about 2° C./h. It will be appreciated that the heating rate may be any value between any of the minimum and maximum values noted above. It will be further appreciated that the heating rate may be any value within a range between any numerical values between the maximum and minimum values noted above.

According to still another embodiment, the duration of the sintering cycle may be at least about 15 days, such as, at least about 20 days, at least about 25 days, at least about 30 days, at least about 35 days, at least about 40 days, at least about 45 days, at least about 50 days, at least about 55 days, at least about 60 days, at least about 65 days, at least about 70 days, at least about 75 days, at least about 80 days or even at least about 85 days. Further, the sintering cycle duration may be not greater than about 90 days, such as, not greater than about 85 days, not greater than about 80 days, not greater than about 75 days, not greater than about 70 days, not greater than about 65 days, not greater than about 60 days, not greater than about 55 days, not greater than about 50 days, not greater than about 45 days, not greater than about 40 days, not greater than about 35 days, not greater than about 30 days, not greater than about 25 days or even not greater than about 20 days. It will be appreciated that the sintering cycle may be any number of days between any of the minimum and maximum values noted above. It will be further appreciated that the sintering cycle may be any number of days within a range between any of the maximum and minimum values noted above.

According to one particular embodiment, the cooling rate may be at least about 1° C./h, such as, at least about 3° C./h, at least about 5° C./h, at least about 8° C./h, at least about 10° C./h, at least about 13° C./h, at least about 15° C./h, at least about 18° C./h, at least about 20° C./h, at least about 23° C./h, at least about 25° C./h, at least about 28° C./h or even at least about 29° C./h. According to still other embodiments, the heating rate may be not greater than about 30° C./h, such as, not greater than about 27° C./h, not greater than about 25° C./h, not greater than about 22° C./h, not greater than about 20° C./h, not greater than about 17° C./h, not greater than about 15° C./h, not greater than about 12° C./h, not greater than about 10° C./h, not greater than about 7° C./h, not greater than about 5° C./h or even not greater than about 2° C./h. It will be appreciated that the cooling rate may be any value between any of the minimum and maximum values noted above. It will be further appreciated that the cooling rate may be any value within a range between any numerical values between the maximum and minimum values noted above.

The shape of the body after sintering generally corresponds to the shape of the green body prior to sintering. Thus, the body may have any of the shapes as previously described with respect to the green body. During sintering, some shrinkage may occur, and the body may be smaller than the green body.

According to yet another embodiment, a forming composition for forming a refractory object as described herein may have a particular $Cr_2O_3$ content in wt. % of a total weight of the forming composition. For example, the forming composition may have a $Cr_2O_3$ content of at least about 80 wt. %, such as, at least about 83 wt. %, at least about 85 wt. %, at least about 88 wt. %, at least about 90 wt. %, at least about 93 wt. % or even at least about 95 wt. %. According to yet another embodiment, the forming composition may have a $Cr_2O_3$ content of not greater than about 98 wt. %, such as, not greater than about 97.5 wt. %, not greater than about 97 wt. %, not greater than about 96.5 wt. % or even not greater than about 96 wt. %. It will be appreciated that the forming composition may have a $Cr_2O_3$ content of any value between any of the minimum and maximum values noted above. It will be further appreciated that the forming composition may have a $Cr_2O_3$ content within a range between any of the minimum and maximum values noted above.

According to yet another embodiment, a forming composition for forming a refractory object as described herein may have a particular $Al_2O_3$ content in wt. % of a total weight of the forming composition. For example, the forming composition may have an $Al_2O_3$ content of at least about 0.7 wt. %, such as, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % or even at least about 4.0 wt. %. According to yet another embodiment, the forming composition may have an $Al_2O_3$ content of not greater than about 10 wt. %, such as, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % or even not greater than about 6.0 wt. %. It will be appreciated that the forming composition may have an $Al_2O_3$ content of any value between any of the minimum and maximum values noted above. It will be further appreciated that the forming composition may have an $Al_2O_3$ content within a range between any of the minimum and maximum values noted above.

According to yet another embodiment, a forming composition for forming a refractory object as described herein may have a particular $SiO_2$ content in wt. % of a total weight of the forming composition. For example, the forming composition may have a $SiO_2$ content of at least about 0.3 wt. %, such as, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % or even at least about 2.5 wt. %. According to yet another embodiment, the forming composition may have a $SiO_2$ content of not greater than about 5 wt. %, such as, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % or even not greater than about 2.7 wt. %. It will be appreciated that the forming composition may have a $SiO_2$ content of any value between any of the minimum and maximum values noted above. It will be further appreciated that the forming composition may have a $SiO_2$ content within a range between any of the minimum and maximum values noted above.

According to yet another embodiment, a forming composition for forming a refractory object as described herein may have a particular mullite content in wt. % of a total weight of the forming composition. For example, the forming composition may have an mullite content of at least about 0.7 wt. %, such as, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % or even at least about 4.0 wt. %. According to yet another embodiment, the forming composition may have an mullite content of not greater than about 10 wt. %, such as, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % or even not greater than about 6.0 wt. %. It will be appreciated that the forming composition may have a mullite content of any value between any of the minimum and maximum values noted above. It will be further appreciated that the forming composition may have a mullite content within a range between any of the minimum and maximum values noted above.

According to yet another embodiment, a forming composition for forming a refractory object as described herein may have a particular $TiO_2$ content in wt. % of a total weight of the forming composition. For example, the forming composition may have a $TiO_2$ content of at least about 1.0 wt. %, such as, at least about 1.3 wt. %, at least about 1.5 wt. %, at least about 1.8 wt. %, at least about 2.0 wt. %, at least about 2.3 wt. % or even at least about 2.5 wt. %. According to yet another embodiment, the forming composition may have a $TiO_2$ content of not greater than about 5.6 wt. %, such as, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 3.0 wt. %, not greater than about 3.7 wt. %, not greater than about 3.5 wt. %, not greater than about 3.2 wt. %, not greater than about 3.0 wt. % or even not greater than about 2.7 wt. %. It will be appreciated that the forming composition may have a $TiO_2$ content of any value between any of the minimum and maximum values noted above. It will be further appreciated that the forming composition may have a $TiO_2$ content within a range between any of the minimum and maximum values noted above.

According to yet another embodiment, a forming composition for forming a refractory object as described herein may have a particular MgO content in wt. % of a total weight of the forming composition. For example, the forming composition may have a MgO content of at least about 0.1 wt. %, such as, at least about 0.2 wt. %, at least about 0.3 wt. %, at least about 0.4 wt. %, at least about 0.5 wt. %, at least about 0.6 wt. % or even at least about 0.7 wt. %. According to yet another embodiment, the forming composition may have a MgO content of not greater than about 1.0 wt. %, such as, not greater than about 0.9 wt. % or even not greater than about 0.8 wt. %. It will be appreciated that the forming composition may have a MgO content of any value between any of the minimum and maximum values noted above. It will be further appreciated that the forming composition may have a MgO content within a range between any of the minimum and maximum values noted above.

According to yet another embodiment, a forming composition for forming a refractory object as described herein may have a particular $ZrO_2$ content in wt. % of a total weight of the forming composition. For example, the forming composition may have a $ZrO_2$ content of at least about 0.1 wt. %, such as, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % or even at least about 5.0 wt. %. According to yet another embodiment, the forming composition may have a $ZrO_2$ content of not greater than about 10 wt. %, such as, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. % or even not greater than about 5.2 wt. %. It will be appreciated that the forming composition may have a $ZrO_2$ content of any value between any of the minimum and maximum values noted above. It will be further appreciated that the forming composition may have a $ZrO_2$ content within a range between any of the minimum and maximum values noted above.

According to yet another embodiment, a forming composition for forming a refractory object as described herein may have a particular grog content in wt. % of a total weight of the forming composition. For example, the forming composition may have a grog content of at least about 1.0 wt. %, such as, at least about 5 wt. %, at least about 10 wt. %, at least about 15 wt. %, at least about 20 wt. %, at least about 25 wt. % or even at least about 30 wt. %. According to yet another embodiment, the forming composition may have a grog content of not greater than about 60 wt. %, such as, not greater than about 55 wt. %, not greater than about 50 wt. %, not greater than about 45 wt. %, not greater than about 40 wt. %, not greater than about 35 wt. % or even not greater than about 30 wt. %. It will be appreciated that the forming composition may have a grog content of any value between any of the minimum and maximum values noted above. It will be further appreciated that the forming composition may have a grog content within a range between any of the minimum and maximum values noted above.

According to still another embodiment, a forming composition for forming a refractory object as described herein may have a particular ratio $FCC_{Al2O3}/FCC_{SiO2}$, where $FCC_{Al2O3}$ represents a content of $Al_2O_3$ in wt. % of the total weight of the forming composition and $FCC_{SiO2}$ represents a content of $SiO_2$ in wt. % of the total weight of the forming composition. For example, the forming composition may have a ratio $FCC_{Al2O3}/FCC_{SiO2}$ of at least about 0.9, such as, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 or even at least about 5.0. According to still another embodiment, the forming composition may have a ratio $FCC_{Al2O3}/FCC_{SiO2}$ of not greater than about 6.5, such as, not greater than about 6.2, not greater than about 6.0, not greater than about 5.7, not greater than about 5.5 or even not greater than about 5.2. It will be appreciated that the forming composition may have a ratio $FCC_{Al2O3}/FCC_{SiO2}$ of any value between any of the minimum and maximum values noted above. It will be further appreciated that the forming composition may have a ratio $FCC_{Al2O3}/FCC_{SiO2}$ within a range between any of the minimum and maximum values noted above.

According to yet another embodiment, a forming composition for forming a refractory object as described herein may have a ratio $FCC_{ZrO2}/FCC_{Al2O3}$, where $FCC_{ZrO2}$ represents a content of $ZrO_2$ in wt. % of the total weight of the forming composition and $FCC_{Al2O3}$ represents a content of $Al_2O_3$ in wt. % of the total weight of the forming composition. For example, the forming composition may have a ratio $FCC_{ZrO2}/FCC_{Al2O3}$ of at least about 0.1, such as, at least about 0.5, at least about 1.0, at least about 1.5 or even at least about 2.0. According to yet another embodiment, the forming composition may have a ratio $FCC_{ZrO2}/FCC_{Al2O3}$ of not greater than about 5, such as, not greater than about 4.5, not greater than about 4.0, not greater than about 3.5, not greater than about 3.0 or even not greater than about 2.5. It will be appreciated that the forming composition may have a ratio $FCC_{ZrO2}/FCC_{Al2O3}$ of any value between any of the minimum and maximum values noted above. It will be further appreciated that the forming composition may have a ratio $FCC_{ZrO2}/FCC_{Al2O3}$ within a range between any of the minimum and maximum values noted above.

According to still another embodiment, a forming composition for forming a refractory object as described herein may have a particular $Fe_2O_3$ content in wt. % of a total weight of the forming composition. For example, the forming composition may have a $Fe_2O_3$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of $Fe_2O_3$.

According to still another embodiment, a forming composition for forming a refractory object as described herein may have a particular CaO content in wt. % of a total weight of the forming composition. For example, the forming composition may have a CaO content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of CaO.

According to still another embodiment, a forming composition for forming a refractory object as described herein may have a particular $Na_2O$ content in wt. % of a total weight of the forming composition. For example, the forming composition may have a $Na_2O$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %.

According to still another embodiment the forming composition may be essentially free of Na$_2$O.

According to still another embodiment, a forming composition for forming a refractory object as described herein may have a particular K$_2$O content in wt. % of a total weight of the forming composition. For example, the forming composition may have a K$_2$O content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of K$_2$O.

According to still another embodiment, a forming composition for forming a refractory object as described herein may have a particular HfO$_2$ content in wt. % of a total weight of the forming composition. For example, the forming composition may have a HfO$_2$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of HfO$_2$.

According to still another embodiment, a forming composition for forming a refractory object as described herein may have a particular MnO$_2$ content in wt. % of a total weight of the forming composition. For example, the forming composition may have a MnO$_2$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of MnO$_2$.

According to still another embodiment, a forming composition for forming a refractory object as described herein may have a particular NiO content in wt. % of a total weight of the forming composition. For example, the forming composition may have a NiO content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the forming composition may be essentially free of NiO.

According to still another embodiment, a forming composition for forming a refractory object as described herein may have a particular V$_2$O$_5$ content in wt. % of a total weight of the forming composition. For example, the forming composition may have a V$_2$O$_5$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment, the forming composition may be essentially free of V$_2$O$_5$.

According to still another embodiment, the forming composition may include a particular content of Fe$_2$O$_3$, CaO, Na$_2$O, K$_2$O, HfO$_2$, MnO$_2$, NiO, V$_2$O$_5$ combined in wt. % of a total weight of the forming composition. For example, the forming composition may include not greater than about 1.5 wt. % of Fe$_2$O$_3$, CaO, Na$_2$O, K$_2$O, HfO$_2$, MnO$_2$, NiO, V$_2$O$_5$ combined, such as, not greater than about 1.2 wt. % of Fe$_2$O$_3$, CaO, Na$_2$O, K$_2$O, HfO$_2$, MnO$_2$, NiO, V$_2$O$_5$ combined, not greater than about 1.0 wt. % of Fe$_2$O$_3$, CaO, Na$_2$O, K$_2$O, HfO$_2$, MnO$_2$, NiO, V$_2$O$_5$ combined, not greater than about 0.7 wt. % of Fe$_2$O$_3$, CaO, Na$_2$O, K$_2$O, HfO$_2$, MnO$_2$, NiO, V$_2$O$_5$ combined, not greater than about 0.5 wt. % of Fe$_2$O$_3$, CaO, Na$_2$O, K$_2$O, HfO$_2$, MnO$_2$, NiO, V$_2$O$_5$ combined, not greater than about 0.2 wt. % of Fe$_2$O$_3$, CaO, Na$_2$O, K$_2$O, HfO$_2$, MnO$_2$, NiO, V$_2$O$_5$ combined, not greater than about 0.1 wt. % of Fe$_2$O$_3$, CaO, Na$_2$O, K$_2$O, HfO$_2$, MnO$_2$, NiO, V$_2$O$_5$ combined. According to still another embodiment, the forming composition may be essentially free of Fe$_2$O$_3$, CaO, Na$_2$O, K$_2$O, HfO$_2$, MnO$_2$, NiO, V$_2$O$_5$ combined.

According to yet another embodiment, the forming composition may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali earth oxides may include any oxide compositions that include group two metals (i.e., beryllium, calcium, strontium, barium and radium), for example, calcium oxide and barium oxide. Alkali oxides may include any oxide compositions that include group one metals, (i.e., lithium, sodium, potassium, rubidium, cesium, and francium), for example, lithium oxide, potassium oxide and cesium oxide. A forming composition that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the forming composition.

According to yet another embodiment, a refractory object formed according to methods described herein may have a particular Cr$_2$O$_3$ content in wt. % of a total weight of the refractory object. For example, the refractory object may have a Cr$_2$O$_3$ content of at least about 80 wt. %, such as, at least about 83 wt. %, at least about 85 wt. %, at least about 88 wt. %, at least about 90 wt. %, at least about 93 wt. % or even at least about 95 wt. %. According to yet another embodiment, the refractory object may have a Cr$_2$O$_3$ content of not greater than about 98 wt. %, such as, not greater than about 97.5 wt. %, not greater than about 97 wt. %, not greater than about 96.5 wt. % or even not greater than about 96 wt. %. It will be appreciated that the refractory object may have a Cr$_2$O$_3$ content of any value between any of the minimum and maximum values noted above. It will be further appreciated that the refractory object may have a Cr$_2$O$_3$ content within a range between any of the minimum and maximum values noted above.

According to yet another embodiment, a refractory object formed according to methods described herein may have a particular Al$_2$O$_3$ content in wt. % of a total weight of the refractory object. For example, the refractory object may have an Al$_2$O$_3$ content of at least about 0.7 wt. %, such as, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % or even at least about 4.0 wt. %. According to yet another embodiment, the refractory object may have an Al$_2$O$_3$ content of not greater than about 10 wt. %, such as, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % or even not greater than about 6.0 wt. %. It will be appreciated that the refractory object may have an $Al_2O_3$ content of any value between any of the minimum and maximum values noted above. It will be further appreciated that the refractory object may have an $Al_2O_3$ content within a range between any of the minimum and maximum values noted above.

According to yet another embodiment, a refractory object formed according to methods described herein may have a particular $SiO_2$ content in wt. % of a total weight of the refractory object. For example, the refractory object may have a $SiO_2$ content of at least about 0.3 wt. %, such as, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % or even at least about 2.5 wt. %. According to yet another embodiment, the refractory object may have a $SiO_2$ content of not greater than about 5 wt. %, such as, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % or even not greater than about 2.7 wt. %. It will be appreciated that the refractory object may have a $SiO_2$ content of any value between any of the minimum and maximum values noted above. It will be further appreciated that the refractory object may have a $SiO_2$ content within a range between any of the minimum and maximum values noted above.

According to yet another embodiment, a refractory object formed according to methods described herein may have a particular $TiO_2$ content in wt. % of a total weight of the refractory object. For example, the refractory object may have a $TiO_2$ content of at least about 1.0 wt. %, such as, at least about 1.3 wt. %, at least about 1.5 wt. %, at least about 1.8 wt. %, at least about 2.0 wt. %, at least about 2.3 wt. % or even at least about 2.5 wt. %. According to yet another embodiment, the refractory object may have a $TiO_2$ content of not greater than about 5.6 wt. %, such as, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % or even not greater than about 2.7 wt. %. It will be appreciated that the refractory object may have a $TiO_2$ content of any value between any of the minimum and maximum values noted above. It will be further appreciated that the refractory object may have a $TiO_2$ content within a range between any of the minimum and maximum values noted above.

According to yet another embodiment, a refractory object formed according to methods described herein may have a particular MgO content in wt. % of a total weight of the refractory object. For example, the refractory object may have a MgO content of at least about 0.1 wt. %, such as, at least about 0.2 wt. %, at least about 0.3 wt. %, at least about 0.4 wt. %, at least about 0.5 wt. %, at least about 0.6 wt. % or even at least about 0.7 wt. %. According to yet another embodiment, the refractory object may have a MgO content of not greater than about 1.0 wt. %, such as, not greater than about 0.9 wt. % or even not greater than about 0.8 wt. %. It will be appreciated that the refractory object may have a MgO content of any value between any of the minimum and maximum values noted above. It will be further appreciated that the refractory object may have a MgO content within a range between any of the minimum and maximum values noted above.

According to yet another embodiment, a refractory object formed according to methods described herein may have a particular $ZrO_2$ content in wt. % of a total weight of the refractory object. For example, the refractory object may have a $ZrO_2$ content of at least about 0.1 wt. %, such as, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % or even at least about 5.0 wt. %. According to yet another embodiment, the refractory object may have a $ZrO_2$ content of not greater than about 10 wt. %, such as, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. % or even not greater than about 5.2 wt. %. It will be appreciated that the refractory object may have a $ZrO_2$ content of any value between any of the minimum and maximum values noted above. It will be further appreciated that the refractory object may have a $ZrO_2$ content within a range between any of the minimum and maximum values noted above.

According to yet another embodiment, a refractory object formed according to methods described herein may have a particular grog content in wt. % of a total weight of the refractory object. For example, the refractory object may have a grog content of at least about 1.0 wt. %, such as, at least about 5 wt. %, at least about 10 wt. %, at least about 15 wt. %, at least about 20 wt. %, at least about 25 wt. % or even at least about 30 wt. %. According to yet another embodiment, the refractory object may have a grog content of not greater than about 60 wt. %, such as, not greater than about 55 wt. %, not greater than about 50 wt. %, not greater than about 45 wt. %, not greater than about 40 wt. %, not greater than about 35 wt. % or even not greater than about 30 wt. %. It will be appreciated that the refractory object may have a grog content of any value between any of the minimum and maximum values noted above. It will be further appreciated that the refractory object may have a grog content within a range between any of the minimum and maximum values noted above.

According to still another embodiment, a refractory object formed according to methods described herein may have a particular ratio $ROC_{Al2O3}/ROC_{SiO2}$, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object. For example, the refractory object may have a ratio $ROC_{Al2O3}/ROC_{SiO2}$ of at least about 0.9, such as, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 or even at least about 5.0. According to still another embodiment, the refractory object may have a ratio $ROC_{Al2O3}/ROC_{SiO2}$ of not greater than about 6.5, such as, not greater than about 6.2, not greater than about 6.0, not greater than about 5.7, not greater than about 5.5 or even not greater than about 5.2. It will be appreciated that the refractory object may have a ratio $ROC_{Al2O3}/ROC_{SiO2}$ of any value between any of the minimum and maximum values noted above. It will be further appreciated that the refractory object may have a ratio $ROC_{Al2O3}/ROC_{SiO2}$ within a range between any of the minimum and maximum values noted above.

According to yet another embodiment, a refractory object formed according to methods described herein may have a ratio $ROC_{ZrO2}/ROC_{Al2O3}$, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object. For example, the refractory object may have a ratio $ROC_{ZrO2}/ROC_{Al2O3}$ of at least about 0.1, such as, at least about 0.5, at least about 1.0, at least about 1.5 or even at least about 2.0. According to yet another embodiment, the refractory object may have a ratio $ROC_{ZrO2}/ROC_{Al2O3}$ of not greater than about 5, such as, not greater than about 4.5, not greater than about 4.0, not greater than about 3.5, not greater than about 3.0 or even not greater than about 2.5. It will be appreciated that the refractory object may have a ratio $ROC_{ZrO2}/ROC_{Al2O3}$ of any value between any of the minimum and maximum values noted above. It will be further appreciated that the refractory object may have a ratio $ROC_{ZrO2}/ROC_{Al2O3}$ within a range between any of the minimum and maximum values noted above.

According to still another embodiment, a refractory object formed according to methods described herein may have a particular $Fe_2O_3$ content in wt. % of a total weight of the refractory object. For example, the refractory object may have a $Fe_2O_3$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of $Fe_2O_3$.

According to still another embodiment, a refractory object formed according to methods described herein may have a particular CaO content in wt. % of a total weight of the refractory object. For example, the refractory object may have a CaO content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of CaO.

According to still another embodiment, a refractory object formed according to methods described herein may have a particular $Na_2O$ content in wt. % of a total weight of the refractory object. For example, the refractory object may have a $Na_2O$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of $Na_2O$.

According to still another embodiment, a refractory object formed according to methods described herein may have a particular $K_2O$ content in wt. % of a total weight of the refractory object. For example, the refractory object may have a $K_2O$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of $K_2O$.

According to still another embodiment, a refractory object formed according to methods described herein may have a particular $HfO_2$ content in wt. % of a total weight of the refractory object. For example, the refractory object may have a $HfO_2$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of $HfO_2$.

According to still another embodiment, a refractory object formed according to methods described herein may have a particular $MnO_2$ content in wt. % of a total weight of the refractory object. For example, the refractory object may have a $MnO_2$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of $MnO_2$.

According to still another embodiment, a refractory object formed according to methods described herein may have a particular NiO content in wt. % of a total weight of the refractory object. For example, the refractory object may have a NiO content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment the refractory object may be essentially free of NiO.

According to still another embodiment, a refractory object formed according to methods described herein may have a particular $V_2O_5$ content in wt. % of a total weight of the refractory object. For example, the refractory object may have a $V_2O_5$ content of not greater than about 1.0 wt. %, such as, not greater than about 0.8 wt. %, not greater than about 0.5 wt. %, not greater than about 0.4 wt. %, not greater than about 0.3 wt. %, not greater than about 0.2 wt. % or even not greater than about 0.1 wt. %. According to still another embodiment, the refractory object may be essentially free of $V_2O_5$.

According to still another embodiment, a refractory object formed according to methods described herein may include a particular content of $Fe_2O_3$, CaO, $Na_2O$, $K_2O$, $HfO_2$, $MnO_2$, NiO, $V_2O_5$ combined in wt. % of a total weight of the refractory object. For example, the refractory object may include not greater than about 1.5 wt. % of $Fe_2O_3$, CaO, $Na_2O$, $K_2O$, $HfO_2$, $MnO_2$, NiO, $V_2O_5$ combined, such as, not greater than about 1.2 wt. % of $Fe_2O_3$, CaO, $Na_2O$, $K_2O$, $HfO_2$, $MnO_2$, NiO, $V_2O_5$ combined, not greater than about 1.0 wt. % of $Fe_2O_3$, CaO, $Na_2O$, $K_2O$, $HfO_2$, $MnO_2$, NiO, $V_2O_5$ combined, not greater than about 0.7 wt. % of $Fe_2O_3$, CaO, $Na_2O$, $K_2O$, $HfO_2$, $MnO_2$, NiO, $V_2O_5$ combined, not greater than about 0.5 wt. % of $Fe_2O_3$, CaO, $Na_2O$, $K_2O$, $HfO_2$, $MnO_2$, NiO, $V_2O_5$ combined, not greater than about 0.2 wt. % of $Fe_2O_3$, CaO, $Na_2O$, $K_2O$, $HfO_2$, $MnO_2$, NiO, $V_2O_5$ combined, not greater than about 0.1 wt. % of $Fe_2O_3$, CaO, $Na_2O$, $K_2O$, $HfO_2$, $MnO_2$, NiO, $V_2O_5$ combined. According to still another embodiment, the refractory object may be essentially free of $Fe_2O_3$, CaO, $Na_2O$, $K_2O$, $HfO_2$, $MnO_2$, NiO, $V_2O_5$ combined.

According to yet another embodiment, a refractory object formed according to methods described herein may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide. Alkali earth oxides may include any oxide compositions that include group two metals (i.e., beryllium, magnesium, calcium, strontium, barium and radium), for example, magnesium oxide, calcium oxide and barium oxide. Alkali oxides may include any oxide compositions that include group one metals, (i.e., lithium, sodium, potassium, rubidium, cesium, and francium), for example, lithium oxide, potassium oxide and cesium oxide. A refractory object that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the refractory object.

According to yet another embodiment, a refractory object formed according to methods described herein may have a particular porosity in vol. % of the total volume of the refractory object as measured using ASTM C373. For example, the refractory object may have a porosity of at least about 0.07 vol. %, such as, at least about 0.1 vol. %, at least about 0.3 vol. %, at least about 0.5 vol. %, at least about 0.8 vol. %, at least about 1.0 vol. %, at least about 1.3 vol. %, at least about 1.5 vol. %, at least about 1.8 vol. %, at least about 2.0 vol. %, at least about 2.3 vol. %, at least about 2.5 vol. %, at least about 2.8 vol. %, at least about 3.0 vol. %, at least about 4.0 vol. %, at least about 5.0 vol. %, at least about 6.0 vol. %, at least about 7.0 vol. %, at least about 8.0 vol. %, at least about 9.0 vol. % or even at least about 10.0 vol. %. According to still another embodiment, the refractory object may have a porosity of not greater than about 18 vol. %, such as, not greater than about 17 vol. %, not greater than about 16 vol. %, not greater than about 15 vol. %, not greater than about 14 vol. %, not greater than about 13 vol. %, not greater than about 12 vol. % or even not greater than about 11 vol. %. It will be appreciated that the refractory object may have a porosity of any value between any of the minimum and maximum values noted above. It will be further appreciated that the refractory object may have a porosity within a range between any of the minimum and maximum values noted above.

According to yet another embodiment, a refractory object formed according to methods described herein may have a particular density as measured using ASTM C373. For example, the refractory object may have a density of at least about 4.1 g/cm³, such as, at least about 4.2 g/cm³, at least about 4.3 g/cm³, at least about 4.4 g/cm³ or even at least about 4.5 g/cm³. According to still another embodiment, the refractory object may have a density of not greater than about 4.8 g/cm³, such as, not greater than about 4.7 g/cm³ or even not greater than about 4.6 g/cm³. It will be appreciated that the refractory object may have a density of any value between any of the minimum and maximum values noted above. It will be further appreciated that the refractory object may have a density within a range between any of the minimum and maximum values noted above.

According to a particular embodiment, a refractory object formed according to methods described herein may have a particular modulus of rupture (MOR) as measured in MPa at 1200° C. using ASTM D6272. For example, the refractory object may have an MOR of at least about 37 MPa, such as, at least about 38 MPa, at least about 39 MPa, at least about 40 MPa, at least about 41 MPa, at least about 42 MPa, at least about 43 MPa, at least about 44 MPa, at least about 45 MPa, at least about 46 MPa or even at least about 47 MPa. According to still another embodiment, a refractory object may have ab MOR of not greater than about 150 MPa, such as, not greater than about 100 MPa or even not greater than 80 MPa. It will be appreciated that the refractory object may have an MOR of any value between any of the minimum and maximum values noted above. It will be further appreciated that the refractory object may have an MOR within a range between any of the minimum and maximum values noted above.

According to yet another embodiment, a refractory object formed according to methods described herein may have a particular modulus of elasticity (MOE) as measured in GPa at 1200° C. using ASTM D6272. For example, the refractory object may have a MOE of at least about 40 GPa, such as, at least about 45 GPa, at least about 50 GPa, at least about 55 GPa, at least about 60 GPa, at least about 65 GPa, at least about 70 GPa, at least about 75 GPa, at least about 80 GPa, at least about 85 GPa or even at least about 90 GPa. According to still other embodiment, the refractory object may have a MOE of not greater than about 120 GPa, such as, not greater than about 115 GPa, not greater than about 110 GPa, not greater than about 105 GPa, not greater than about 100 GPa or even not greater than about 95 GPa. It will be appreciated that the refractory object may have an MOE of any value between any of the minimum and maximum values noted above. It will be further appreciated that the refractory object may have an MOE within a range between any of the minimum and maximum values noted above.

According to yet another embodiment, a refractory object formed according to methods described herein may have a particular ratio $RO_{MOR}/(1000*RO_{MOE})$, where $RO_{MOR}$ is equal to the MOR of the refractory object as measured in MPa at 1200° C. and $RO_{MOE}$ is equal to the MOE of the refractory object as measured in GPa at 1200° C. For example, the refractory object may have a ratio $RO_{MOR}/(1000*RO_{MOE})$ of at least about 0.5, such as, at least about 0.6, at least about 0.7, at least about 0.8, at least about 0.9, at least about 1.0, at least at least about 1.1, at least about 1.2 or even at least about 1.3. According to yet another embodiment, the refractory object may have a ratio $RO_{MOR}/(1000*RO_{MOE})$ of not greater than about 1.5, such as, not greater than about 1.45 or even not greater than about 1.4. It will be appreciated that the refractory object may have a ratio $RO_{MOR}/(1000*RO_{MOE})$ of any value between any of the minimum and maximum values noted above. It will be further appreciated that the refractory object may have a ratio $RO_{MOR}/(1000*RO_{MOE})$ within a range between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A refractory object comprising: a $Cr_2O_3$ content of at least about 80 wt. % of a total weight of the refractory object; an $Al_2O_3$ content of at least about 0.7 wt. % and not greater than about 10.0 wt. % of the total weight of the refractory object; a $SiO_2$ content of at least about 0.3 wt. % and not greater than about 5.0 wt. % of the total weight of the refractory object; a $TiO_2$ content of at least about 1.0 wt. % and not greater than about 5.6 wt. % $TiO_2$ of the total weight of the refractory object; and an MOR of at least about 37 MPa as measured at 1200° C.

Embodiment 2

A refractory object comprising: a $Cr_2O_3$ content of at least about 80 wt. % of a total weight of the refractory object; an $Al_2O_3$ content of at least about 0.7 wt. % and not greater than about 10.0 wt. % of the total weight of the refractory object; a $SiO_2$ content of at least about 0.3 wt. % and not greater than about 5.0 wt. % of a total weight of the refractory object; a $TiO_2$ content of at least about 1.0 wt. % and not greater than about 5.6 wt. % $TiO_2$ of the total weight of the refractory object; and a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

Embodiment 3

A refractory object comprising: a $Cr_2O_3$ content of at least about 80 wt. % of a total weight of the refractory object; a $TiO_2$ content of at least about 1.0 wt. % and not greater than about 5.6 wt. % $TiO_2$ of the total weight of the refractory object; and a ratio $ROC_{Al2O3}/ROC_{SiO2}$ of at least about 1 and not greater than about 8, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

Embodiment 4

The refractory object of any one of embodiments 1, 2 and 3, wherein the refractory object further comprises an MOR of at least about 37 MPa as measured at 1200° C., at least about 38 MPa, at least about 39 MPa, at least about 40 MPa, at least about 41 MPa, at least about 42 MPa, at least about 43 MPa, at least about 44 MPa, at least about 45 MPa, at least about 46 MPa, and at least about 47 MPa.

Embodiment 5

The refractory object of any one of embodiments 1, 2 and 3, wherein the refractory object further comprises an MOR of not greater than about 150 MPa, not greater than about 100 MPa, not greater than 80 MPa.

Embodiment 6

The refractory object of any one of embodiments 1, 2 and 3, wherein the refractory object further comprises a ratio $RO_{MOR}/(1000*RO_{MOE})$ of at least about 0.5, where $RO_{MOR}$ is equal to the MOR of the refractory object as measured in MPa at 1200° C. and $R_{MOE}$ is equal to the MOE of the refractory object in GPa as measured at 1200° C., at least about 0.6, at least about 0.7, at least about 0.8, at least about 0.9, at least about 1.0, at least at least about 1.1, at least about 1.2 and at least about 1.3.

Embodiment 7

The refractory object of any one of embodiments 1, 2 and 3, wherein the refractory object further comprises a ratio $RO_{MOR}/(1000*RO_{MOE})$ of not greater than about 1.5, where $RO_{MOR}$ is equal to the MOR of the refractory object as measured in MPa at 1200° C. and $RO_{MOE}$ is equal to the MOE of the refractory object in GPa as measured at 1200° C., not greater than about 1.45 and not greater than about 1.4.

Embodiment 8

The refractory object of any one of embodiments 1, 2 and 3, wherein the refractory object further comprises a ratio $ROC_{Al2O3}/ROC_{SiO2}$ of at least about 0.9, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 9

The refractory object of any one of embodiments 1, 2 and 3, wherein the refractory object further comprises a ratio $ROC_{Al2O3}/ROC_{SiO2}$ of not greater than about 6.5, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object, not greater than about 6.2, not greater than about 6.0, not greater than about 5.7, not greater than about 5.5, and not greater than about 5.2.

Embodiment 10

The refractory object of any one of embodiments 1, 2 and 3, wherein the refractory object further comprises a $Cr_2O_3$ content of at least about 80 wt. % of the total weight of the refractory object, at least about 83 wt. %, at least about 85 wt. %, at least about 88 wt. %, at least about 90 wt. %, at least about 93 wt. % and at least about 95 wt. %.

Embodiment 11

The refractory object of any one of embodiments 1, 2 and 3, wherein the refractory object further comprises a $Cr_2O_3$ content of not greater than about 98 wt. % of the total weight of the refractory object, not greater than about 97.5 wt. %, not greater than about 97 wt. %, not greater than about 96.5 wt. % and not greater than about 96 wt. %.

Embodiment 12

The refractory object of any one of embodiments 1, 2 and 3, wherein the refractory object further comprises an $Al_2O_3$ content of at least about 0.7 wt. % of the total weight of the refractory object, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % and at least about 4.0 wt. %.

Embodiment 13

The refractory object of any one of embodiments 1, 2 and 3, wherein the refractory object further comprises an $Al_2O_3$ content of not greater than about 10 wt. % of the total weight of the refractory object, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % and not greater than about 6.0 wt. %.

Embodiment 14

The refractory object of any one of embodiments 1, 2 and 3, wherein the refractory object further comprises a $SiO_2$ content of at least about 0.3 wt. % of the total weight of the refractory object, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % and at least about 2.5 wt. %.

Embodiment 15

The refractory object of any one of embodiments 1, 2 and 3, wherein the refractory object further comprises a $SiO_2$ content of not greater than about 5 wt. % of the total weight of the refractory object, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 16

The refractory object of any one of embodiments 1, 2 and 3, wherein the refractory object further comprises a $TiO_2$ content of at least about 1.0 wt. % of the total weight of the refractory object, at least about 1.3 wt. %, at least about 1.5 wt. %, at least about 1.8 wt. %, at least about 2.0 wt. %, at least about 2.3 wt. % and at least about 2.5 wt. %.

Embodiment 17

The refractory object of any one of embodiments 1, 2 and 3, wherein the refractory object further comprises a $TiO_2$ content of not greater than about 5.6 wt. % of the total weight of the refractory object, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. %, not greater than about 2.7 wt. %.

Embodiment 18

The refractory object of any one of embodiments 1, 2 and 3, wherein the refractory object further comprises a MgO content of at least about 0.1 wt. % of the total weight of the refractory object, at least about 0.2 wt. %, at least about 0.3 wt. %, at least about 0.4 wt. %, at least about 0.5 wt. %, at least about 0.6 wt. % and at least about 0.7 wt. %.

Embodiment 19

The refractory object of any one of embodiments 1, 2 and 3, wherein the refractory object further comprises a MgO content of not greater than about 1.0 wt. % of the total weight of the refractory object, not greater than about 0.9 wt. % and not greater than about 0.8 wt. %.

Embodiment 20

The refractory object of any one of embodiments 1, 2 and 3, wherein the refractory object further comprises a $ZrO_2$ content of at least about 0.1 wt. % of the total weight of the refractory object, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % and at least about 5.0 wt. %.

Embodiment 21

The refractory object of any one of embodiments 1, 2 and 3, wherein the refractory object further comprises a $ZrO_2$ content of not greater than about 10 wt. % of the total weight of the refractory object, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. %, not greater than about 5.2 wt. %.

Embodiment 22

The refractory object of any one of embodiments 1, 2 and 3, wherein the refractory object further comprises a grog content of at least about 1.0 wt. % of the total weight of the refractory object, at least about 5 wt. %, at least about 10 wt. %, at least about 15 wt. %, at least about 20 wt. %, at least about 25 wt. % and at least about 30 wt. %.

Embodiment 23

The refractory object of any one of embodiments 1, 2 and 3, wherein the refractory object further comprises a grog content of not greater than about 60 wt. % of the total weight of the refractory object, not greater than about 55 wt. %, not greater than about 50 wt. %, not greater than about 45 wt. %, not greater than about 40 wt. %, not greater than about 35 wt. %, not greater than about 30 wt. %.

Embodiment 24

The refractory object of any one of embodiments 1, 2 and 3, wherein the refractory object further comprises a ratio $ROC_{ZrO2}/ROC_{Al2O3}$ of at least about 0.1, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, at least about 0.5, at least about 1.0, at least about 1.5, at least about 2.0.

Embodiment 25

The refractory object of any one of embodiments 1, 2 and 3, wherein the refractory object further comprises a ratio $ROC_{ZrO2}/ROC_{Al2O3}$ of not greater than about 5, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, not greater than about 4.5, not greater than about 4.0, not greater than about 3.5, not greater than about 3.0, not greater than about 2.5.

Embodiment 26

The refractory object of any one of embodiments 1, 2 and 3, wherein the refractory object further comprises a porosity of at least about 0.07 vol. % of the total volume of the refractory object, at least about 0.1 vol. %, at least about 0.3 vol. %, at least about 0.5 vol. %, at least about 0.8 vol. %, at least about 1.0 vol. %, at least about 1.3 vol. %, at least about 1.5 vol. %, at least about 1.8 vol. %, at least about 2.0 vol. %, at least about 2.3 vol. %, at least about 2.5 vol. %, at least about 2.8 vol. %, at least about 3.0 vol. %, at least about 4.0 vol. %, at least about 5.0 vol. %, at least about 6.0 vol. %, at least about 7.0 vol. %, at least about 8.0 vol. %, at least about 9.0 vol. % and at least about 10.0 vol. %.

Embodiment 27

The refractory object of any one of embodiments 1, 2 and 3, wherein the refractory object further comprises a porosity of not greater than about 18 vol. % of the total volume of the refractory object, not greater than about 17 vol. %, not greater than about 16 vol. %, not greater than about 15 vol. %, not greater than about 14 vol. %, not greater than about 13 vol. %, not greater than about 12 vol. % and not greater than about 11 vol. %.

Embodiment 28

The refractory object of any one of embodiments 1, 2 and 3, wherein the refractory object further comprises a density of at least about 4.1 g/cm³, at least about 4.2 g/cm³, at least about 4.3 g/cm³, at least about 4.4 g/cm³ and at least about 4.5 g/cm³.

Embodiment 29

The refractory object of any one of embodiments 1, 2 and 3, wherein the refractory object further comprises a density of not greater than about 4.8 g/cm3, not greater than about 4.7 g/cm3 and not greater than about 4.6 g/cm³.

Embodiment 30

The refractory object of any one of embodiments 1, 2 and 3, wherein the refractory object further comprises a MOE of at least about 40 GPa as measured in at 1200° C., at least about 45 GPa, at least about 50 GPa, at least about 55 GPa, at least about 60 GPa, at least about 65 GPa, at least about 70 GPa, at least about 75 GPa, at least about 80 GPa, at least about 85 GPa and at least about 90 GPa.

Embodiment 31

The refractory object of any one of embodiments 1, 2 and 3, wherein the refractory object further comprises a MOE of not greater than about 120 GPa as measured at 1200° C., not greater than about 115 GPa, not greater than about 110 GPa, not greater than about 105 GPa, not greater than about 100 GPa and not greater than about 95 GPa.

Embodiment 32

A method of forming a refractory object comprising: providing a $Cr_2O_3$ composition; and forming the $Cr_2O_3$ composition into a refractory object, wherein the refractory object comprises: a $Cr_2O_3$ content of at least about 80 wt. % of a total weight of the refractory object; an $Al_2O_3$ content of at least about 0.7 wt. % and not greater than about 10.0 wt. % of the total weight of the refractory object; a $SiO_2$ content of at least about 0.3 wt. % and not greater than about 5.0 wt. % of the total weight of the refractory object; a $TiO_2$ content of at least about 1.0 wt. % and not greater than about 5.6 wt. % $TiO_2$ of the total weight of the refractory object; and an MOR of at least about 37 MPa as measured at 1200° C.

Embodiment 33

A method of forming a refractory object comprising: providing a $Cr_2O_3$ composition; and forming the $Cr_2O_3$ composition into a refractory object, wherein the refractory object comprises: a $Cr_2O_3$ content of at least about 80 wt. % of a total weight of the refractory object; an $Al_2O_3$ content of at least about 0.7 wt. % and not greater than about 10.0 wt. % of the total weight of the refractory object; a $SiO_2$ content of at least about 0.3 wt. % and not greater than about 5.0 wt. % of the total weight of the refractory object; a $TiO_2$ content of at least about 1.0 wt. % and not greater than about 5.6 wt. % $TiO_2$ of the total weight of the refractory object; and a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

Embodiment 34

A method of forming a refractory object comprising: providing a $Cr_2O_3$ composition; and forming the $Cr_2O_3$ composition into a refractory object, wherein the refractory object comprises: a $Cr_2O_3$ content of at least about 80 wt. % of a total weight of the refractory object; a $TiO_2$ content of at least about 1.0 wt. % and not greater than about 5.6 wt. % $TiO_2$ of the total weight of the refractory object; and a ratio $ROC_{Al2O3}/ROC_{SiO2}$ of at least about 1 and not greater than about 8, where $ROC_{Al2O3}$ represents a content of $Al_2O_3$ in wt. % of a total weight of the refractory object and $ROC_{SiO2}$ represents a content of $SiO_2$ in wt. % of the total weight of the refractory object.

Embodiment 35

The method of any one of embodiments 32, 33 and 34, wherein the refractory object further comprises an MOR of at least about 37 MPa as measured at 1200° C., at least about 38 MPa, at least about 39 MPa, at least about 40 MPa, at least about 41 MPa, at least about 42 MPa, at least about 43 MPa, at least about 44 MPa, at least about 45 MPa, at least about 46 MPa and at least about 47 MPa.

Embodiment 36

The method of any one of embodiments 32, 33 and 34, wherein the refractory object further comprises an MOR of not greater than about 150 MPa, not greater than about 100 MPa and not greater than 80 MPa.

Embodiment 37

The method of any one of embodiments 32, 33 and 34, wherein the refractory object further comprises a ratio $RO_{MOR}/(1000*RO_{MOE})$ of at least about 0.5, where $RO_{MOR}$ is equal to the MOR of the refractory object as measured in MPa at 1200° C. and $R_{MOE}$ is equal to the MOE of the refractory object in GPa as measured at 1200° C., at least about 0.6, at least about 0.7, at least about 0.8, at least about 0.9, at least about 1.0, at least at least about 1.1, at least about 1.2 and at least about 1.3.

Embodiment 38

The method of any one of embodiments 32, 33 and 34, wherein the refractory object further comprises a ratio $RO_{MOR}/(1000*RO_{MOE})$ of not greater than about 1.5, where $RO_{MOR}$ is equal to the MOR of the refractory object as measured in MPa at 1200° C. and $RO_{MOE}$ is equal to the MOE of the refractory object in GPa as measured at 1200° C., not greater than about 1.45 and not greater than about 1.4.

Embodiment 39

The method of any one of embodiments 32, 33 and 34, wherein the refractory object further comprises a ratio $ROC_{Al2O3}/ROC_{SiO2}$ of at least about 0.9, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 40

The method of any one of embodiments 32, 33 and 34, wherein the refractory object further comprises a ratio $ROC_{Al2O3}/ROC_{SiO2}$ of not greater than about 6.5, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object, not greater than about 6.2, not greater than about 6.0, not greater than about 5.7, not greater than about 5.5, and not greater than about 5.2.

Embodiment 41

The method of any one of embodiments 32, 33 and 34, wherein the refractory object further comprises a $Cr_2O_3$ content of at least about 80 wt. % of a total weight of the refractory object, at least about 83 wt. %, at least about 85 wt. %, at least about 88 wt. %, at least about 90 wt. %, at least about 93 wt. % and at least about 95 wt. %.

Embodiment 42

The method of any one of embodiments 32, 33 and 34, wherein the refractory object further comprises a $Cr_2O_3$ content of not greater than about 98 wt. % of the total weight of the refractory object, not greater than about 97.5 wt. %, not greater than about 97 wt. %, not greater than about 96.5 wt. % and not greater than about 96 wt. %.

Embodiment 43

The method of any one of embodiments 32, 33 and 34, wherein the refractory object further comprises an $Al_2O_3$ content of at least about 0.7 wt. % of the total weight of the refractory object, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % and at least about 4.0 wt. %.

Embodiment 44

The method of any one of embodiments 32, 33 and 34, wherein the refractory object further comprises an $Al_2O_3$ content of not greater than about 10 wt. % of the total weight of the refractory object, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % and not greater than about 6.0 wt. %.

Embodiment 45

The method of any one of embodiments 32, 33 and 34, wherein the refractory object further comprises a $SiO_2$ content of at least about 0.3 wt. % of the total weight of the refractory object, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % and at least about 2.5 wt. %.

Embodiment 46

The method of any one of embodiments 32, 33 and 34, wherein the refractory object further comprises a $SiO_2$ content of not greater than about 5 wt. % of a total weight of the refractory object, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 47

The method of any one of embodiments 32, 33 and 34, wherein the refractory object further comprises a $TiO_2$ content of at least about 1.0 wt. % of the total weight of the refractory object, at least about 1.3 wt. %, at least about 1.5 wt. %, at least about 1.8 wt. %, at least about 2.0 wt. %, at least about 2.3 wt. % and at least about 2.5 wt. %.

Embodiment 48

The method of any one of embodiments 32, 33 and 34, wherein the refractory object further comprises a $TiO_2$ content of not greater than about 5.6 wt. % of the total weight of the refractory object, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 3.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 49

The method of any one of embodiments 32, 33 and 34, wherein the refractory object further comprises a MgO content of at least about 0.1 wt. % of the total weight of the refractory object, at least about 0.2 wt. %, at least about 0.3 wt. %, at least about 0.4 wt. %, at least about 0.5 wt. %, at least about 0.6 wt. % and at least about 0.7 wt. %.

Embodiment 50

The method of any one of embodiments 32, 33 and 34, wherein the refractory object further comprises a MgO content of not greater than about 1.0 wt. % of the total weight of the refractory object, not greater than about 0.9 wt. % and not greater than about 0.8 wt. %.

Embodiment 51

The method of any one of embodiments 32, 33 and 34, wherein the refractory object further comprises a $ZrO_2$ content of at least about 0.1 wt. % of the total weight of the refractory object, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % and at least about 5.0 wt. %.

Embodiment 52

The method of any one of embodiments 32, 33 and 34, wherein the refractory object further comprises a $ZrO_2$ content of not greater than about 10 wt. % of the total weight of the refractory object, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. % and not greater than about 5.2 wt. %.

Embodiment 53

The method of any one of embodiments 32, 33 and 34, wherein the refractory object further comprises a grog content of at least about 1.0 wt. % of the total weight of the refractory object, at least about 5 wt. %, at least about 10 wt. %, at least about 15 wt. %, at least about 20 wt. %, at least about 25 wt. % and at least about 30 wt. %.

Embodiment 54

The method of any one of embodiments 32, 33 and 34, wherein the refractory object further comprises a grog content of not greater than about 60 wt. % of the total weight of the refractory object, not greater than about 55 wt. %, not greater than about 50 wt. %, not greater than about 45 wt. %, not greater than about 40 wt. %, not greater than about 35 wt. % and not greater than about 30 wt. %.

Embodiment 55

The method of any one of embodiments 32, 33 and 34, wherein the refractory object further comprises a ratio $ROC_{ZrO2}/ROC_{Al2O3}$ of at least about 0.1, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, at least about 0.5, at least about 1.0, at least about 1.5, at least about 2.0.

Embodiment 56

The method of any one of embodiments 32, 33 and 34, wherein the refractory object further comprises a ratio $ROC_{ZrO2}/ROC_{Al2O3}$ of not greater than about 5, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, not greater than about 4.5, not greater than about 4.0, not greater than about 3.5, not greater than about 3.0, not greater than about 2.5.

Embodiment 57

The method of any one of embodiments 32, 33 and 34, wherein the refractory object further comprises a porosity of at least about 0.07 vol. % of the total volume of the refractory object, at least about 0.1 vol. %, at least about 0.3 vol. %, at least about 0.5 vol. %, at least about 0.8 vol. %, at least about 1.0 vol. %, at least about 1.3 vol. %, at least about 1.5 vol. %, at least about 1.8 vol. %, at least about 2.0 vol. %, at least about 2.3 vol. %, at least about 2.5 vol. %, at least about 2.8 vol. %, at least about 3.0 vol. %, at least about 4.0 vol. %, at least about 5.0 vol. %, at least about 6.0 vol. %, at least about 7.0 vol. %, at least about 8.0 vol. %, at least about 9.0 vol. % and at least about 10.0 vol. %.

Embodiment 58

The method of any one of embodiments 32, 33 and 34, wherein the refractory object further comprises a porosity of not greater than about 18 vol. % of the total volume of the refractory object, not greater than about 17 vol. %, not greater than about 16 vol. %, not greater than about 15 vol. %, not greater than about 14 vol. %, not greater than about 13 vol. %, not greater than about 12 vol. % and not greater than about 11 vol. %.

Embodiment 59

The method of any one of embodiments 32, 33 and 34, wherein the refractory object further comprises a density of at least about 4.1 g/cm$^3$, at least about 4.2 g/cm$^3$, at least about 4.3 g/cm$^3$, at least about 4.4 g/cm$^3$ and at least about 4.5 g/cm$^3$.

Embodiment 60

The method of any one of embodiments 32, 33 and 34, wherein the refractory object further comprises a density of not greater than about 4.8 g/cm3, not greater than about 4.7 g/cm3 and not greater than about 4.6 g/cm$^3$.

Embodiment 61

The refractory object of any one of embodiments 32, 33 and 34, wherein the refractory object further comprises a MOE of at least about 40 GPa as measured in at 1200° C., at least about 45 GPa, at least about 50 GPa, at least about 55 GPa, at least about 60 GPa, at least about 65 GPa, at least about 70 GPa, at least about 75 GPa, at least about 80 GPa, at least about 85 GPa and at least about 90 GPa.

Embodiment 62

The method of any one of embodiments 32, 33 and 34, wherein the refractory object further comprises a MOE of not greater than about 120 GPa as measured at 1200° C., not greater than about 115 GPa, not greater than about 110 GPa, not greater than about 105 GPa, not greater than about 100 GPa and not greater than about 95 GPa.

Embodiment 63

A refractory object, wherein the refractory object is formed from a forming composition comprising: a $Cr_2O_3$ content of at least about 80 wt. % of a total weight of the forming composition; an $Al_2O_3$ content of at least about 0.7 wt. % and not greater than about 10.0 wt. % of the total weight of the forming composition; a $SiO_2$ content of at least about 0.3 wt. % and not greater than about 5.0 wt. % of the total weight of the forming composition; a $TiO_2$ content of at least about 1.0 wt. % and not greater than about 5.6 wt. % $TiO_2$ of the total weigh of the forming composition; and wherein the refractory object has an MOR of at least about 37 MPa as measured at 1200° C.

Embodiment 64

A refractory object formed from a forming composition comprising: a $Cr_2O_3$ content of at least about 80 wt. % of a total weight of the forming composition; an $Al_2O_3$ content of at least about 0.7 wt. % and not greater than about 10.0 wt. % of the total weight of the forming composition; a $SiO_2$ content of at least about 0.3 wt. % and not greater than about 5.0 wt. % of the total weight of the forming composition; a $TiO_2$ content of at least about 1.0 wt. % and not greater than about 5.6 wt. % $TiO_2$ of the total weight of the forming composition; and wherein the refractory object has a ratio $RO_{MOR}/(1000*RO_{MOE})$ of at least about 0.5, where $RO_{MOR}$ is equal to the MOR of the refractory object as measured in MPa at 1200° C. and $RO_{MOE}$ is equal to the MOE of the refractory object as measured in GPa at 1200° C.

Embodiment 65

A refractory object formed from a forming composition comprising: a $Cr_2O_3$ content of at least about 80 wt. % of a total weight of the forming composition; a $TiO_2$ content of at least about 1.0 wt. % and not greater than about 5.6 wt. % $TiO_2$ of the total weigh of the forming composition; and wherein the refractory object comprises a ratio $ROC_{Al2O3}/ROC_{SiO2}$ of at least about 1 and not greater than about 8, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

Embodiment 66

The refractory object of any one of embodiments 63, 64 and 65, wherein the refractory object further comprises an MOR of at least about 37 MPa as measured at 1200° C., at least about 38 MPa, at least about 39 MPa, at least about 40 MPa, at least about 41 MPa, at least about 42 MPa, at least about 43 MPa, at least about 44 MPa, at least about 45 MPa, at least about 46 MPa and at least about 47 MPa.

Embodiment 67

The refractory object of any one of embodiments 63, 64 and 65, wherein the refractory object further comprises an MOR of not greater than about 150 MPa, not greater than about 100 MPa, not greater than 80 MPa.

Embodiment 68

The refractory object of any one of embodiments 63, 64 and 65, wherein the refractory object further comprises a ratio $RO_{MOR}/(1000*RO_{MOE})$ of at least about 0.5, where $RO_{MOR}$ is equal to the MOR of the refractory object as measured in MPa at 1200° C. and $R_{MOE}$ is equal to the MOE of the refractory object in GPa as measured at 1200° C., at least about 0.6, at least about 0.7, at least about 0.8, at least about 0.9, at least about 1.0, at least at least about 1.1, at least about 1.2 and at least about 1.3.

Embodiment 69

The refractory object of any one of embodiments 63, 64 and 65, wherein the refractory object further comprises a ratio $RO_{MOR}/(1000*RO_{MOE})$ of not greater than about 1.5, where $RO_{MOR}$ is equal to the MOR of the refractory object as measured in MPa at 1200° C. and $RO_{MOE}$ is equal to the MOE of the refractory object in GPa as measured at 1200° C., not greater than about 1.45 and not greater than about 1.4.

Embodiment 70

The refractory object of any one of embodiments 63, 64 and 65, wherein the refractory object further comprises a ratio $ROC_{Al2O3}/ROC_{SiO2}$ of at least about 0.9, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 71

The refractory object of any one of embodiments 63, 64 and 65, wherein the refractory object further comprises a ratio $ROC_{Al2O3}/ROC_{SiO2}$ of not greater than about 6.5, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object, not greater than about 6.2, not greater than about 6.0, not greater than about 5.7, not greater than about 5.5, and not greater than about 5.2.

Embodiment 72

The refractory object of any one of embodiments 63, 64 and 65, wherein the forming composition further comprises a ratio $FCC_{Al2O3}/FCC_{SiO2}$ of at least about 0.9, wherein $FCC_{Al2O3}$ represents a content of $Al_2O_3$ in wt. % of the total weight of the forming composition and $FCC_{SiO2}$ represents a content of $SiO_2$ in wt. % of the total weight of the forming composition, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 73

The refractory object of any one of embodiments 63, 64 and 65, wherein the forming composition further comprises a ratio $FCC_{Al2O3}/FCC_{SiO2}$ of not greater than about 6.5, where $FCC_{Al2O3}$ represents a content of $Al_2O_3$ in wt. % of the total weight of the forming composition and $FCC_{SiO2}$ represents a content of $SiO_2$ in wt. % of the total weight of the forming composition, not greater than about 6.2, not greater than about 6.0, not greater than about 5.7, not greater than about 5.5, and not greater than about 5.2.

Embodiment 74

The refractory object of any one of embodiments 63, 64 and 65, wherein the forming composition further comprises a $Cr_2O_3$ content of at least about 80 wt. % of the total weight of the forming composition, at least about 83 wt. %, at least about 85 wt. %, at least about 88 wt. %, at least about 90 wt. %, at least about 93 wt. % and at least about 95 wt. %.

Embodiment 75

The refractory object of any one of embodiments 63, 64 and 65, wherein the forming composition further comprises a $Cr_2O_3$ content of not greater than about 98 wt. % of the total weight of the forming composition, not greater than about 97.5 wt. %, not greater than about 97 wt. %, not greater than about 96.5 wt. % and not greater than about 96 wt. %.

Embodiment 76

The refractory object of any one of embodiments 63, 64 and 65, wherein the forming composition further comprises an $Al_2O_3$ content of at least about 0.7 wt. % of the total weight of the forming composition, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % and at least about 4.0 wt. %.

Embodiment 77

The refractory object of any one of embodiments 63, 64 and 65, wherein the forming composition further comprises an $Al_2O_3$ content of not greater than about 10 wt. % of the total weight of the forming composition, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % and not greater than about 6.0 wt. %.

Embodiment 78

The refractory object of any one of embodiments 63, 64 and 65, wherein the forming composition further comprises a $SiO_2$ content of at least about 0.3 wt. % of the total weight of the forming composition, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % and at least about 2.5 wt. %.

Embodiment 79

The refractory object of any one of embodiments 63, 64 and 65, wherein the forming composition further comprises a $SiO_2$ content of not greater than about 5 wt. % of the total weight of the forming composition, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 80

The refractory object of any one of embodiments 63, 64 and 65, wherein the forming composition further comprises a $TiO_2$ content of at least about 1.0 wt. % of the total weight of the forming composition, at least about 1.3 wt. %, at least about 1.5 wt. %, at least about 1.8 wt. %, at least about 2.0 wt. %, at least about 2.3 wt. % and at least about 2.5 wt. %.

Embodiment 81

The refractory object of any one of embodiments 63, 64 and 65, wherein the forming composition further comprises a $TiO_2$ content of not greater than about 5.6 wt. % of the total weight of the forming composition, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 3.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 82

The refractory object of any one of embodiments 63, 64 and 65, wherein the forming composition further comprises a MgO content of at least about 0.1 wt. % of the total weight of the forming composition, at least about 0.2 wt. %, at least about 0.3 wt. %, at least about 0.4 wt. %, at least about 0.5 wt. %, at least about 0.6 wt. % and at least about 0.7 wt. %.

Embodiment 83

The refractory object of any one of embodiments 63, 64 and 65, wherein the forming composition further comprises a MgO content of not greater than about 1.0 wt. % of the total weight of the forming composition, not greater than about 0.9 wt. % and not greater than about 0.8 wt. %.

Embodiment 84

The refractory object of any one of embodiments 63, 64 and 65, wherein the forming composition further comprises a $ZrO_2$ content of at least about 0.1 wt. % of the total weight of the forming composition, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % and at least about 5.0 wt. %.

Embodiment 85

The refractory object of any one of embodiments 63, 64 and 65, wherein the forming composition further comprises a $ZrO_2$ content of not greater than about 10 wt. % of the total weight of the forming composition, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. % and not greater than about 5.2 wt. %.

Embodiment 86

The refractory object of any one of embodiments 63, 64 and 65, wherein the forming composition further comprises a grog content of at least about 1.0 wt. % of the total weight of the forming composition, at least about 5 wt. %, at least about 10 wt. %, at least about 15 wt. %, at least about 20 wt. %, at least about 25 wt. % and at least about 30 wt. %.

Embodiment 87

The refractory object of any one of embodiments 63, 64 and 65, wherein the forming composition further comprises a grog content of not greater than about 60 wt. % of the total weight of the forming composition, not greater than about 55 wt. %, not greater than about 50 wt. %, not greater than about 45 wt. %, not greater than about 40 wt. %, not greater than about 35 wt. % and not greater than about 30 wt. %.

Embodiment 88

The refractory object of any one of embodiments 63, 64 and 65, wherein the forming composition further comprises a ratio $ROC_{ZrO2}/ROC_{Al2O3}$ of at least about 0.1, where $ROC_{ZrO2}$ represents a content of $ZrO_2$ in wt. % of the total weight of the forming composition and $ROC_{Al2O3}$ represents a content of $Al_2O_3$ in wt. % of the total weight of the forming composition, at least about 0.5, at least about 1.0, at least about 1.5 and at least about 2.0.

Embodiment 89

The refractory object of any one of embodiments 63, 64 and 65, wherein the forming composition further comprises a ratio $ROC_{ZrO2}/ROC_{Al2O3}$ of not greater than about 5, where $ROC_{ZrO2}$ represents a content of $ZrO_2$ in wt. % of the total weight of the forming composition and $ROC_{Al2O3}$ represents a content of $Al_2O_3$ in wt. % of the total weight of the forming composition, not greater than about 4.5, not greater than about 4.0, not greater than about 3.5, not greater than about 3.0 and not greater than about 2.5.

Embodiment 90

The refractory object of any one of embodiments 63, 64 and 65, wherein the refractory object further comprises a ratio $ROC_{ZrO2}/ROC_{Al2O3}$ of at least about 0.1, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, at least about 0.5, at least about 1.0, at least about 1.5 and at least about 2.0.

Embodiment 91

The refractory object of any one of embodiments 63, 64 and 65, wherein the refractory object further comprises a ratio $ROC_{ZrO2}/ROC_{Al2O3}$ of not greater than about 5, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, not greater than about 4.5, not greater than about 4.0, not greater than about 3.5, not greater than about 3.0 and not greater than about 2.5.

Embodiment 92

The refractory object of any one of embodiments 63, 64 and 65, wherein the refractory object further comprises a porosity of at least about 0.07 vol. % of the total volume of the refractory object, at least about 0.1 vol. %, at least about 0.3 vol. %, at least about 0.5 vol. %, at least about 0.8 vol. %, at least about 1.0 vol. %, at least about 1.3 vol. %, at least about 1.5 vol. %, at least about 1.8 vol. %, at least about 2.0 vol. %, at least about 2.3 vol. %, at least about 2.5 vol. %, at least about 2.8 vol. %, at least about 3.0 vol. %, at least about 4.0 vol. %, at least about 5.0 vol. %, at least about 6.0 vol. %, at least about 7.0 vol. %, at least about 8.0 vol. %, at least about 9.0 vol. % and at least about 10.0 vol. %.

Embodiment 93

The refractory object of any one of embodiments 63, 64 and 65, wherein the refractory object further comprises a porosity of not greater than about 18 vol. % of the total volume of the refractory object, not greater than about 17 vol. %, not greater than about 16 vol. %, not greater than about 15 vol. %, not greater than about 14 vol. %, not greater than about 13 vol. %, not greater than about 12 vol. % and not greater than about 11 vol. %.

Embodiment 94

The refractory object of any one of embodiments 63, 64 and 65, wherein the refractory object further comprises a density of at least about 4.1 g/cm³, at least about 4.2 g/cm³, at least about 4.3 g/cm³, at least about 4.4 g/cm³ and at least about 4.5 g/cm³.

Embodiment 95

The refractory object of any one of embodiments 63, 64 and 65, wherein the refractory object further comprises a density of not greater than about 4.8 g/cm3, not greater than about 4.7 g/cm3 and not greater than about 4.6 g/cm³.

Embodiment 96

The refractory object of any one of embodiments 63, 64 and 65, wherein the refractory object further comprises a MOE of at least about 40 GPa as measured in at 1200° C., at least about 45 GPa, at least about 50 GPa, at least about 55 GPa, at least about 60 GPa, at least about 65 GPa, at least about 70 GPa, at least about 75 GPa, at least about 80 GPa, at least about 85 GPa and at least about 90 GPa.

Embodiment 97

The refractory object of any one of embodiments 63, 64 and 65, wherein the refractory object further comprises a MOE of not greater than about 120 GPa as measured at 1200° C., not greater than about 115 GPa, not greater than about 110 GPa, not greater than about 105 GPa, not greater than about 100 GPa and not greater than about 95 GPa.

Embodiment 98

A method of forming a refractory object comprising: providing a forming composition comprising: a $Cr_2O_3$ content of at least about 80 wt. % of a total weight of the forming composition; an $Al_2O_3$ content of at least about 0.7 wt. % and not greater than about 10.0 wt. % of the total weight of the forming composition; a $SiO_2$ content of at least about 0.3 wt. % and not greater than about 5.0 wt. % of the total weight of the forming composition; a $TiO_2$ content of at least about 1.0 wt. % and not greater than about 5.6 wt. % $TiO_2$ of the total weigh of the forming composition; and forming the forming composition into a refractory object having an MOR of at least about 37 MPa as measured at 1200° C.

Embodiment 99

A method of forming a refractory object comprising: providing a forming composition comprising: a $Cr_2O_3$ content of at least about 80 wt. % of a total weight of the forming composition; an $Al_2O_3$ content of at least about 0.7 wt. % and not greater than about 10.0 wt. % of the total weight of the forming composition; a $SiO_2$ content of at least about 0.3 wt. % and not greater than about 5.0 wt. % of the total weight of the forming composition; a $TiO_2$ content of at least about 1.0 wt. % and not greater than about 5.6 wt. % $TiO_2$ of the total weigh of the forming composition; and forming the forming composition into a refractory object having wherein the refractory object further comprises a MOE of not greater than about 120 GPa as measured at 1200° C., not greater than about 115 GPa, not greater than about 110 GPa, not greater than about 105 GPa, not greater than about 100 GPa and not greater than about 95 GPa.

Embodiment 100

A method of forming a refractory object comprising: providing a forming composition comprising: a $Cr_2O_3$ content of at least about 80 wt. % of a total weight of the forming composition; a $TiO_2$ content of at least about 1.0 wt. % and not greater than about 5.6 wt. % $TiO_2$ of a total weigh of the forming composition; and forming the forming composition into a refractory object comprising a ratio $ROC_{Al2O3}/ROC_{SiO2}$ of at least about 1 and not greater than about 8, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object.

Embodiment 101

The method of any one of embodiments 98, 99 and 100, wherein the refractory object further comprises an MOR of at least about 37 MPa as measured at 1200° C., at least about 38 MPa, at least about 39 MPa, at least about 40 MPa, at least about 41 MPa, at least about 42 MPa, at least about 43 MPa, at least about 44 MPa, at least about 45 MPa, at least about 46 MPa and at least about 47 MPa.

Embodiment 102

The method of any one of embodiments 98, 99 and 100, wherein the refractory object further comprises an MOR of not greater than about 150 MPa, not greater than about 100 MPa, not greater than 80 MPa.

Embodiment 103

The method of any one of embodiments 98, 99 and 100, wherein the refractory object further comprises a ratio $RO_{MOR}/(1000*RO_{MOE})$ of at least about 0.5, where $RO_{MOR}$ is equal to the MOR of the refractory object as measured in MPa at 1200° C. and $R_{MOE}$ is equal to the MOE of the refractory object in GPa as measured at 1200° C., at least about 0.6, at least about 0.7, at least about 0.8, at least about 0.9, at least about 1.0, at least at least about 1.1, at least about 1.2 and at least about 1.3.

Embodiment 104

The method of any one of embodiments 98, 99 and 100, wherein the refractory object further comprises a ratio $RO_{MOR}/(1000*RO_{MOE})$ of not greater than about 1.5, where $RO_{MOR}$ is equal to the MOR of the refractory object as measured in MPa at 1200° C. and $RO_{MOE}$ is equal to the MOE of the refractory object in GPa as measured at 1200° C., not greater than about 1.45 and not greater than about 1.4.

Embodiment 105

The method of any one of embodiments 98, 99 and 100, wherein the refractory object further comprises a ratio $ROC_{Al2O3}/ROC_{SiO2}$ of at least about 0.9, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 106

The method of any one of embodiments 98, 99 and 100, wherein the refractory object further comprises a ratio $ROC_{Al2O3}/ROC_{SiO2}$ of not greater than about 6.5, where $ROC_{Al2O3}$ represents a content of $Al_2O_3$ in wt. % of the total weight of the refractory object and $ROC_{SiO2}$ represents a content of $SiO_2$ in wt. % of the total weight of the refractory object, not greater than about 6.2, not greater than about 6.0, not greater than about 5.7, not greater than about 5.5, and not greater than about 5.2.

Embodiment 107

The method of any one of embodiments 98, 99 and 100, wherein the forming composition further comprises a ratio $FCC_{Al2O3}/FCC_{SiO2}$ of at least about 0.9, wherein $FCC_{Al2O3}$ represents a content of $Al_2O_3$ in wt. % of the total weight of the forming composition and $FCC_{SiO2}$ represents a content of $SiO_2$ in wt. % of the total weight of the forming composition, at least about 1.0, at least about 1.1, at least about 1.2, at least about 1.3, at least about 1.4, at least about 1.5, at least about 1.8, at least about 2.0, at least about 2.3, at least about 2.5, at least about 2.8, at least about 3.0, at least about 3.3, at least about 3.5, at least about 3.8, at least about 4.0, at least about 4.5, at least about 4.8 and at least about 5.0.

Embodiment 108

The method of any one of embodiments 98, 99 and 100, wherein the forming composition further comprises a ratio $FCC_{Al2O3}/FCC_{SiO2}$ of not greater than about 6.5, where $FCC_{Al2O3}$ represents a content of $Al_2O_3$ in wt. % of the total weight of the forming composition and $FCC_{SiO2}$ represents a content of $SiO_2$ in wt. % of the total weight of the forming composition, not greater than about 6.2, not greater than about 6.0, not greater than about 5.7, not greater than about 5.5, and not greater than about 5.2.

Embodiment 109

The method of any one of embodiments 98, 99 and 100, wherein the forming composition further comprises a $Cr_2O_3$ content of at least about 80 wt. % of the total weight of the forming composition, at least about 83 wt. %, at least about 85 wt. %, at least about 88 wt. %, at least about 90 wt. %, at least about 93 wt. % and at least about 95 wt. %.

Embodiment 110

The method of any one of embodiments 98, 99 and 100, wherein the forming composition further comprises a $Cr_2O_3$ content of not greater than about 98 wt. % of the total weight of the forming composition, not greater than about 97.5 wt. %, not greater than about 97 wt. %, not greater than about 96.5 wt. % and not greater than about 96 wt. %.

Embodiment 111

The method of any one of embodiments 98, 99 and 100, wherein the forming composition further comprises an $Al_2O_3$ content of at least about 0.7 wt. % of the total weight of the forming composition, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. % and at least about 4.0 wt. %.

Embodiment 112

The method of any one of embodiments 98, 99 and 100, wherein the forming composition further comprises an $Al_2O_3$ content of not greater than about 10 wt. % of the total weight of the forming composition, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.2 wt. % and not greater than about 6.0 wt. %.

Embodiment 113

The method of any one of embodiments 98, 99 and 100, wherein the forming composition further comprises a $SiO_2$ content of at least about 0.3 wt. % of the total weight of the forming composition, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. % and at least about 2.5 wt. %.

Embodiment 114

The method of any one of embodiments 98, 99 and 100, wherein the forming composition further comprises a $SiO_2$ content of not greater than about 5 wt. % of the total weight of the forming composition, not greater than about 4.7 wt. %, not greater than about 4.5 wt. %, not greater than about 4.2 wt. %, not greater than about 4.0 wt. %, not greater than about 3.7 wt. %, not greater than about 3.5 wt. %, not greater than about 3.2 wt. %, not greater than about 3.0 wt. % and not greater than about 2.7 wt. %.

Embodiment 115

The method of any one of embodiments 98, 99 and 100, wherein the forming composition further comprises a $TiO_2$ content of at least about 1.0 wt. % of the total weight of the forming composition, at least about 1.3 wt. %, at least about 1.5 wt. %, at least about 1.8 wt. %, at least about 2.0 wt. %, at least about 2.3 wt. % and at least about 2.5 wt. %.

Embodiment 116

The method of any one of embodiments 98, 99 and 100, wherein the forming composition further comprises a $TiO_2$ content of not greater than about 5.6 wt. % of the total weight of the forming composition, not greater than about 5.5 wt. %, not greater than about 5.2 wt. %, not greater than about 5.0 wt. %, not greater than about 4.7 wt. %, not greater than about 4.5 wt. %, not greater than about 4.2 wt. %, not greater than about 3.0 wt. %, not greater than about 3.7 wt. %, not greater than about 3.5 wt. %, not greater than about 3.2 wt. %, not greater than about 3.0 wt. % and not greater than about 2.7 wt. %.1

Embodiment 117

The method of any one of embodiments 98, 99 and 100, wherein the forming composition further comprises a MgO content of at least about 0.1 wt. % of the total weight of the forming composition, at least about 0.2 wt. %, at least about 0.3 wt. %, at least about 0.4 wt. %, at least about 0.5 wt. %, at least about 0.6 wt. % and at least about 0.7 wt. %.

Embodiment 118

The method of any one of embodiments 98, 99 and 100, wherein the forming composition further comprises a MgO content of not greater than about 1.0 wt. % of the total weight of the forming composition, not greater than about 0.9 wt. % and not greater than about 0.8 wt. %.

Embodiment 119

The method of any one of embodiments 98, 99 and 100, wherein the forming composition further comprises a $ZrO_2$ content of at least about 0.1 wt. % of the total weight of the forming composition, at least about 0.3 wt. %, at least about 0.5 wt. %, at least about 0.8 wt. %, at least about 1.0 wt. %, at least about 1.3 wt. %, at least about 1.5 wt. %, at least about 1.8 wt. %, at least about 2.0 wt. %, at least about 2.3 wt. %, at least about 2.5 wt. %, at least about 2.8 wt. %, at least about 3.0 wt. %, at least about 3.3 wt. %, at least about 3.5 wt. %, at least about 3.8 wt. %, at least about 4.0 wt. %, at least about 4.3 wt. %, at least about 4.5 wt. %, at least about 4.8 wt. % and at least about 5.0 wt. %.

Embodiment 120

The method of any one of embodiments 98, 99 and 100, wherein the forming composition further comprises a $ZrO_2$ content of not greater than about 10 wt. % of the total weight of the forming composition, not greater than about 9.7 wt. %, not greater than about 9.5 wt. %, not greater than about 9.2 wt. %, not greater than about 9.0 wt. %, not greater than about 8.7 wt. %, not greater than about 8.5 wt. %, not greater than about 8.2 wt. %, not greater than about 8.0 wt. %, not greater than about 7.7 wt. %, not greater than about 7.5 wt. %, not greater than about 7.2 wt. %, not greater than about 7.0 wt. %, not greater than about 6.7 wt. %, not greater than about 6.5 wt. %, not greater than about 6.0 wt. %, not greater than about 5.7 wt. %, not greater than about 5.5 wt. % and not greater than about 5.2 wt. %.

Embodiment 121

The method of any one of embodiments 98, 99 and 100, wherein the forming composition further comprises a grog content of at least about 1.0 wt. % of the total weight of the forming composition, at least about 5 wt. %, at least about 10 wt. %, at least about 15 wt. %, at least about 20 wt. %, at least about 25 wt. % and at least about 30 wt. %.

Embodiment 122

The method of any one of embodiments 98, 99 and 100, wherein the forming composition further comprises a grog content of not greater than about 60 wt. % of the total weight of the forming composition, not greater than about 55 wt. %, not greater than about 50 wt. %, not greater than about 45 wt. %, not greater than about 40 wt. %, not greater than about 35 wt. % and not greater than about 30 wt. %.

Embodiment 123

The method of any one of embodiments 98, 99 and 100, wherein the forming composition further comprises a ratio $ROC_{ZrO2}/ROC_{Al2O3}$ of at least about 0.1, where $ROC_{ZrO2}$ represents a content of $ZrO_2$ in wt. % of the total weight of the forming composition and $ROC_{Al2O3}$ represents a content of $Al_2O_3$ in wt. % of the total weight of the forming composition, at least about 0.5, at least about 1.0, at least about 1.5 and at least about 2.0.

Embodiment 124

The method of any one of embodiments 98, 99 and 100, wherein the forming composition further comprises a ratio $ROC_{ZrO2}/ROC_{Al2O3}$ of at least about 0.1, where $ROC_{ZrO2}$ represents a content of $ZrO_2$ in wt. % of the total weight of the forming composition and $ROC_{Al2O3}$ represents a content of $Al_2O_3$ in wt. % of the total weight of the forming composition, at least about 0.5, at least about 1.0, at least about 1.5 and at least about 2.0.

Embodiment 125

The method of any one of embodiments 98, 99 and 100, wherein the refractory object further comprises a ratio $ROC_{ZrO2}/ROC_{Al2O3}$ of at least about 0.1, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, at least about 0.5, at least about 1.0, at least about 1.5 and at least about 2.0.

Embodiment 126

The method of any one of embodiments 98, 99 and 100, wherein the refractory object further comprises a ratio $ROC_{ZrO2}/ROC_{Al2O3}$ of not greater than about 5, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object, not greater than about 4.5, not greater than about 4.0, not greater than about 3.5, not greater than about 3.0 and not greater than about 2.5.

Embodiment 127

The method of any one of embodiments 98, 99 and 100, wherein the refractory object further comprises a porosity of at least about 0.07 vol. % of the total volume of the refractory object, at least about 0.1 vol. %, at least about 0.3 vol. %, at least about 0.5 vol. %, at least about 0.8 vol. %, at least about 1.0 vol. %, at least about 1.3 vol. %, at least about 1.5 vol. %, at least about 1.8 vol. %, at least about 2.0 vol. %, at least about 2.3 vol. %, at least about 2.5 vol. %, at least about 2.8 vol. %, at least about 3.0 vol. %, at least about 4.0 vol. %, at least about 5.0 vol. %, at least about 6.0 vol. %, at least about 7.0 vol. %, at least about 8.0 vol. %, at least about 9.0 vol. % and at least about 10.0 vol. %.

Embodiment 128

The method of any one of embodiments 98, 99 and 100, wherein the refractory object further comprises a porosity of not greater than about 18 vol. % of the total volume of the refractory object, not greater than about 17 vol. %, not greater than about 16 vol. %, not greater than about 15 vol. %, not greater than about 14 vol. %, not greater than about 13 vol. %, not greater than about 12 vol. % and not greater than about 11 vol. %.

Embodiment 129

The method of any one of embodiments 98, 99 and 100, wherein the refractory object further comprises a density of at least about 4.1 g/cm$^3$, at least about 4.2 g/cm$^3$, at least about 4.3 g/cm$^3$, at least about 4.4 g/cm$^3$ and at least about 4.5 g/cm$^3$.

Embodiment 130

The method of any one of embodiments 98, 99 and 100, wherein the refractory object further comprises a density of not greater than about 4.8 g/cm3, not greater than about 4.7 g/cm3 and not greater than about 4.6 g/cm$^3$.

Embodiment 131

The method of any one of embodiments 98, 99 and 100, wherein the refractory object further comprises a MOE of at least about 40 GPa as measured in at 1200° C., at least about 45 GPa, at least about 50 GPa, at least about 55 GPa, at least about 60 GPa, at least about 65 GPa, at least about 70 GPa, at least about 75 GPa, at least about 80 GPa, at least about 85 GPa and at least about 90 GPa.

Embodiment 132

The method of any one of embodiments 98, 99 and 100, wherein the refractory object further comprises a MOE of not greater than about 120 GPa as measured at 1200° C., not greater than about 115 GPa, not greater than about 110 GPa, not greater than about 105 GPa, not greater than about 100 GPa and not greater than about 95 GPa.

EXAMPLES

Example 1

Forming compositions were prepared according to embodiments described herein and formed according to embodiments described herein into refractory material samples S1-S9.

Table 1 summarizes the composition of the formed refractory material samples S1-S9 and the measured physical characteristics of the samples, including density, porosity and MOR.

TABLE 1

| | | | | | | | | | |
|---|---|---|---|---|---|---|---|---|---|
| $Cr_2O_3$ REFRACTORY COMPOSITIONS | | | | | | | | | |
| SAMPLE #'s | S1 | S2 | S3 | S4 | S5 | S6 | S7 | S8 | S9 |
| Formed Refractory Composition (wt. % of total refractory) | | | | | | | | | |
| $Cr_2O_3$ | 92.0 | 91.6 | 90.0 | 85.7 | 84.0 | 94.0 | 90.6 | 85.1 | 92.0 |
| $Al_2O_3$ | 1.8 | 2.1 | 3.6 | 4.7 | 10.0 | 3.6 | 2.1 | 9.1 | 2.3 |
| $SiO_2$ | 1.5 | 1.1 | 1.6 | 5.3 | 1.7 | 1.4 | 1.1 | 1.4 | 1.0 |
| $TiO_2$ | 4.6 | 4.6 | 4.6 | 4.3 | 4.2 | 1.0 | 5.6 | 4.3 | 4.6 |
| $ZrO_2$ | <0.5 | <0.5 | <0.5 | 0.5 | 0.5 | <0.5 | <0.5 | 0.5 | 0.5 |
| Formed Refractory Composition Ratios (wt. % of total refractory/wt. % of total refractory) | | | | | | | | | |
| $Al_2O_3/SiO_2$ | 1.2 | 1.9 | 2.3 | 0.9 | 5.9 | 2.5 | 1.9 | 6.5 | 2.4 |
| Measured Physical Characteristics | | | | | | | | | |
| Density (g/cc) | 4.6 | 4.5 | 4.5 | 4.4 | 4.4 | 4.1 | 4.6 | 4.3 | 4.5 |
| Porosity (vol. %) | 3.1 | 0.6 | 5.1 | 0.6 | 3.9 | 16.4 | 0.5 | 10.0 | 5.2 |
| MOR (MPa) | 55 | 45 | 61 | 60 | 64 | 68 | 46 | 42 | 47 |
| MOR/(1000*MOE) | 0.65 | 0.51 | 0.56 | 0.73 | 0.66 | 1.33 | 0.5 | 0.56 | 0.63 |

Refractory material samples S1-S9 were formed from unprocessed raw materials that included chromium oxide and other components.

Example 2

Forming compositions were prepared according to embodiments described herein and formed according to embodiments described herein into refractory material samples S10-S13.

Table 2 summarizes the composition of the formed refractory material samples S10-S12 and the measured physical characteristics of the samples, including density, porosity and MOR.

TABLE 2

$Cr_2O_3$ REFRACTORY COMPOSITIONS WITH MgO

| SAMPLE #'s | S10 | S11 | S12 |
|---|---|---|---|
| Formed Refractory Composition (wt. % of total refractory) | | | |
| $Cr_2O_3$ | 95.2 | 93.3 | 89.5 |
| $Al_2O_3$ | 0.7 | 2.2 | 3.6 |
| $SiO_2$ | 0.3 | 0.9 | 1.4 |
| $TiO_2$ | 3.8 | 3.7 | 4.6 |
| MgO | 0.5 | 0.5 | 1.0 |
| Formed Refractory Composition Ratios (wt. % of total refractory/wt. % of total refractory) | | | |
| $Al_2O_3/SiO_2$ | 2.5 | 2.5 | 2.5 |
| Measured Physical Characteristics | | | |
| Density (g/cc) | 4.7 | 4.8 | 4.7 |
| Porosity (vol. %) | 2.4 | 0.1 | 0.1 |
| MOR (MPa) | 58 | 75 | 58 |
| MOR/(1000*MOE) | 0.52 | 0.66 | 0.57 |

Refractory material samples S10-S12 were formed from unprocessed raw materials that included chromium oxide and other components.

Example 3

Forming compositions were prepared according to embodiments described herein and formed according to embodiments described herein into refractory material samples S13-S15.

Table 3 summarizes the composition of the formed refractory material samples S13-S15 and the measured physical characteristics of the samples, including density, porosity and MOR.

TABLE 3

$Cr_2O_3$ REFRACTORY COMPOSITIONS WITH ZIRCONIA

| SAMPLE #'s | S13 | S14 | S15 |
|---|---|---|---|
| Formed Refractory Composition (wt. % of total refractory) | | | |
| $Cr_2O_3$ | 88.8 | 86.9 | 83.6 |
| $Al_2O_3$ | 2.2 | 2.1 | 2.1 |
| $SiO_2$ | 1.2 | 1.2 | 1.2 |
| $TiO_2$ | 3.2 | 3.1 | 3.0 |
| $ZrO2$ | 4.6 | 6.6 | 10.1 |
| Formed Refractory Composition Ratios (wt. % of total refractory/wt. % of total refractory) | | | |
| $Al_2O_3/SiO_2$ | 1.8 | 1.8 | 1.8 |
| $ZrO_2/Al_2O_3$ | 2.1 | 3.1 | 4.7 |
| Measured Physical Characteristics | | | |
| Density (g/cc) | 4.2 | 4.3 | 4.2 |
| Porosity (vol. %) | 16.3 | 15.7 | 17.8 |
| MOR (MPa) | 48 | 41 | 40 |
| MOR/(1000*MOE) | 0.63 | 0.83 | 1.0 |

Refractory material samples S13-S15 were formed from unprocessed raw materials that included chromium oxide and other components.

Example 4

Forming compositions were prepared according to embodiments described herein and formed according to embodiments described herein into refractory material samples S16 and S17.

Table 4 summarizes the composition of the formed refractory material samples S16-S18 and the measured physical characteristics of the samples, including density, porosity and MOR.

TABLE 4

$Cr_2O_3$ REFRACTORY COMPOSITIONS WITH GROG

| SAMPLE #'s | S16 | S17 |
|---|---|---|
| Formed Refractory Composition (wt. % of total refractory) | | |
| $Cr_2O_3$ | 92.8 | 44.0 |
| $Al_2O_3$ | 2.2 | 2.1 |
| $SiO_2$ | 0.9 | 1.1 |
| $TiO_2$ | 2.7 | 3.0 |
| Grog (prefired/recycled) | 0.0 | 50.0 |
| Measured Physical Characteristics | | |
| Density (g/cc) | 4.8 | 4.5 |
| Porosity (vol. %) | 0.1 | 0.6 |
| MOR (MPa) | 75 | 45 |
| MOR/(1000*MOE) | 0.66 | 0.51 |

Refractory material samples S16 and S17 were formed from unprocessed raw materials that included chromium oxide and other components.

Example 5

Comparative forming compositions were prepared and formed into comparative refractory material samples CS1-CS12.

Table 5 summarizes the composition of the formed comparative refractory material samples CS1-CS12 and the measured physical characteristics of the samples, including density, porosity and MOR.

TABLE 5

COMPARATIVE REFRACTORY COMPOSITIONS

| SAMPLE #'s | CS1 | CS2 | CS3 | CS4 | CS5 | CS6 | CS7 | CS8 | CS9 | CS10 | CS11 | CS12 |
|---|---|---|---|---|---|---|---|---|---|---|---|---|
| Formed Refractory Composition (wt. % of total refractory) | | | | | | | | | | | | |
| $Cr_2O_3$ | 96.2 | 95.9 | 93.0 | 91.6 | 91.6 | 93.7 | 92.2 | 91.0 | 86.5 | 86.8 | 89.3 | 90.0 |
| $Al_2O_3$ | 0.0 | 0.0 | 0.0 | 0.0 | 3.0 | 0.0 | 0.6 | 1.9 | 8.0 | 1.4 | 0.6 | 0.7 |
| $SiO_2$ | 0.0 | 0.2 | 0.4 | 3.3 | 0.2 | 2.5 | 2.5 | 2.5 | 1.0 | 0.9 | 2.5 | 0.6 |

TABLE 5-continued

COMPARATIVE REFRACTORY COMPOSITIONS

| SAMPLE #'s | CS1 | CS2 | CS3 | CS4 | CS5 | CS6 | CS7 | CS8 | CS9 | CS10 | CS11 | CS12 |
|---|---|---|---|---|---|---|---|---|---|---|---|---|
| $TiO_2$ | 3.8 | 3.5 | 3.4 | 4.6 | 4.7 | 2.6 | 2.6 | 2.6 | 2.5 | 3.1 | 2.6 | 3.2 |
| $ZrO_2$ | <0.5 | <0..5 | 3.3 | <0.5 | <0.5 | <0.5 | <0.5 | <0.5 | <0.5 | 7.7 | 3.5 | 5.5 |
| MgO | 0.5 | 0.0 | 0.0 | 0.0 | 0.0 | 0.0 | 0.0 | 0.0 | 0.0 | 0.0 | 0.0 | 0.0 |
| Formed Refractory Composition Ratios (wt. % of total refractory/wt. % of total refractory) | | | | | | | | | | | | |
| $Al_2O_3/SiO_2$ | NA | 0.0 | 0.0 | 0.0 | 16.7 | 0.0 | 0.3 | 0.7 | 7.8 | 1.6 | 0.3 | 1.1 |
| $ZrO_2/Al_2O_3$ | NA | NA | NA | NA | NA | NA | NA | NA | NA | 5.4 | 5.5 | 7.7 |
| Measured Physical Characteristics | | | | | | | | | | | | |
| Density (g/cc) | 4.9 | 4.3 | 4.3 | 4.7 | 4.5 | 4.45 | 4.56 | 4.56 | 4.39 | 4.2 | 4.42 | 4.2 |
| Porosity (vol. %) | 0.1 | 15.0 | 15.0 | 0.6 | 7.9 | 10.02 | 5.27 | 4.02 | 7.18 | 17.2 | 10.64 | 18.3 |
| MOR (MPa) | 48 | 36.9 | 32.7 | 38 | 38 | 36 | 39 | 46 | 36 | 35 | 45 | 32 |
| MOR/(1000*MOE) | 0.41 | 0.52 | 0.50 | 0.48 | 0.40 | 0.41 | 0.38 | 0.46 | 0.43 | 0.93 | 0.44 | 0.79 |

Comparative refractory material samples CS1-CS12 were formed from unprocessed raw materials that included chromium oxide and other components.

Note that not all of the activities described above in the general description or the examples are required, that a portion of a specific activity may not be required, and that one or more further activities may be performed in addition to those described. Still further, the orders in which activities are listed are not necessarily the order in which they are performed. Any values of properties or characteristics of the embodiments herein can represent average or median values derived from a statistically relevant sample size. Unless otherwise stated, it will be appreciated that compositions are based on a total of 100% and the total content of the components does not exceed 100%.

In the foregoing specification, the concepts have been described with reference to specific embodiments. However, one of ordinary skill in the art appreciates that various modifications and changes can be made without departing from the scope of the invention as set forth in the claims below. Accordingly, the specification and FIGURES are to be regarded in an illustrative rather than a restrictive sense, and all such modifications are intended to be included within the scope of the invention.

As used herein, the terms "comprises", "comprising", "includes", "including", "has", "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A refractory object comprising:
   a $Cr_2O_3$ content of at least about 80 wt. % of a total weight of the refractory object;
   an $Al_2O_3$ content of at least about 0.7 wt. % and not greater than about 10.0 wt. % of the total weight of the refractory object;
   a $SiO_2$ content of at least about 0.3 wt. % and not greater than about 5.0 wt. % of the total weight of the refractory object;
   a $TiO_2$ content of at least about 1.8 wt. % and not greater than about 5.6 wt. % $TiO_2$ of the total weight of the refractory object;
   a $ZrO_2$ content of not greater than about 7.5 wt. % of the total weight of the refractory object;
   a ratio $ROC_{Al2O3}/ROC_{SiO2}$ of at least 1 and not greater than 6.5, wherein $ROC_{Al2O3}$ represents a content of $Al_2O_3$ in wt. % of the total weight of the refractory object and $ROC_{SiO2}$ represents a content of $SiO_2$ in wt. % of the total weight of the refractory object; and
   an MOR of at least about 47 MPa as measured at 1200° C.

2. The refractory object claim 1, wherein the refractory object further comprises a ratio $RO_{MOR}/(1000*RO_{MOE})$ of at least about 0.5, where $RO_{MOR}$ is equal to the MOR of the refractory object as measured in MPa at 1200° C. and $R_{MOE}$ is equal to the MOE of the refractory object in GPa as measured at 1200° C.

3. The refractory object of claim 1, wherein the refractory object further comprises a MgO content of at least about 0.1 wt. % and not greater than about 1.0 wt. % of the total weight of the refractory object.

4. The refractory object of claim 1, wherein the refractory object further comprises a ratio $ROC_{ZrO2}/ROC_{Al2O3}$ of at least about 0.1 and not greater than about 5, where $ROC_{ZrO2}$ represents a content of $ZrO_2$ in wt. % of the total weight of the refractory object and $ROC_{Al2O3}$ represents a content of $Al_2O_3$ in wt. % of the total weight of the refractory object.

5. The refractory object of claim 1, wherein the refractory object further comprises a porosity of at least about 0.07 vol. % and not greater than about 18 vol. % of the total volume of the refractory object.

6. The refractory object of claim 1, wherein the refractory object further comprises a density of at least about 4.1 g/cm³ and not greater than about 4.8 g/cm³.

* * * * *